United States Patent
Erman et al.

(10) Patent No.: US 11,595,292 B2
(45) Date of Patent: Feb. 28, 2023

(54) DYNAMIC NODE CLUSTER DISCOVERY IN AN UNKNOWN TOPOLOGY GRAPH

(71) Applicant: Nokia Solutions and Networks Oy, Espoo (FI)

(72) Inventors: Bilgehan Erman, Weehawken, NJ (US); Ejder Bastug, Paris (FR); Bruce Cilli, Atlantic Highlands, NJ (US); Sameerkumar Sharma, Holmdel, NJ (US); Mahmoud Ashour, University Park, PA (US)

(73) Assignee: Nokia Solutions and Networks Oy, Espoo (FI)

( * ) Notice: Subject to any disclaimer, the term of this patent is extended or adjusted under 35 U.S.C. 154(b) by 61 days.

(21) Appl. No.: 17/184,073

(22) Filed: Feb. 24, 2021

(65) Prior Publication Data
US 2022/0272021 A1    Aug. 25, 2022

(51) Int. Cl.
*H04L 45/02*    (2022.01)
(52) U.S. Cl.
CPC .................... *H04L 45/02* (2013.01)
(58) Field of Classification Search
CPC ....................................... H04L 45/02
USPC .......................... 709/200; 370/254
See application file for complete search history.

(56) References Cited

U.S. PATENT DOCUMENTS

| 7,461,130 | B1 * | 12/2008 | AbdelAziz | H04L 67/104 709/208 |
| 8,266,288 | B2 * | 9/2012 | Banerjee | H04L 61/4511 709/227 |
| 9,374,285 | B1 * | 6/2016 | Ramasubramanian | H04L 41/122 |
| 10,284,381 | B1 * | 5/2019 | Weiner | H04L 45/745 |

(Continued)

OTHER PUBLICATIONS

Ali, R., et al., "Hierarchical Deep Double Q-Routing," 2020 IEEE International Conference on Communications (ICC), Oct. 2019, 7 pages.

(Continued)

*Primary Examiner* — Anthony Mejia
(74) *Attorney, Agent, or Firm* — Tong, Rea, Bentley & Kim, LLC

(57) ABSTRACT

Various example embodiments for supporting dynamic node cluster discovery in a communication network are presented. Various example embodiments for supporting dynamic node cluster discovery in a communication network may be configured to support dynamic node cluster discovery based on circulation of discovery messages within the communication network. Various example embodiments for supporting dynamic node cluster discovery based on the circulation of discovery messages within the communication network may be configured to support dynamic node cluster discovery based on probabilistic forwarding of discovery messages within the communication network. Various example embodiments for supporting dynamic node cluster discovery based on the circulation of discovery messages within the (Continued)

communication network may be configured to support dynamic node cluster discovery based on updating and forwarding of discovery messages within the communication network. Various example embodiments for supporting dynamic node cluster discovery in a communication network may be configured to support dynamic, multi-level node cluster discovery.

19 Claims, 9 Drawing Sheets

(56) References Cited

U.S. PATENT DOCUMENTS

| | | | | |
|---|---|---|---|---|
| 2006/0002311 | A1* | 1/2006 | Iwanaga | H04L 45/02 370/254 |
| 2006/0268742 | A1* | 11/2006 | Chu | H04L 47/10 370/254 |
| 2007/0286393 | A1* | 12/2007 | Roever | G06Q 20/1235 379/221.1 |
| 2009/0180399 | A1* | 7/2009 | Li | H04L 41/12 370/254 |
| 2009/0296602 | A1* | 12/2009 | Bange | H04W 74/0808 370/254 |
| 2013/0286893 | A1* | 10/2013 | Zhu | H04L 45/64 370/254 |
| 2014/0126419 | A1* | 5/2014 | Boland | H04W 64/00 370/254 |
| 2014/0280810 | A1* | 9/2014 | Gabrielson | H04L 41/0806 709/222 |
| 2015/0358226 | A1* | 12/2015 | Liu | H04W 28/065 370/390 |
| 2018/0270134 | A9* | 9/2018 | Bansal | H04L 43/04 |
| 2021/0021512 | A1 | 1/2021 | Erman et al. | |

OTHER PUBLICATIONS

Potter, M.C., "Detecting Meaning in RSVP at 13 ms Per Picture," Attention, Perception, & Psychophysics, vol. 76, No. 2, Dec. 2013, 12 pages.

Von Luxburg, U., et al., "A Tutorial on Spectral Clustering," Statistics and Computing, vol. 17, Issue 4, Nov. 2007, 32 pages.

Perozzi, B. et al., "DeepWalk: Online Learning of Social Representations," Proceedings of the $20^{th}$ International Conference on Knowledge Discovery and Data Mining, Jun. 2014, 10 pages.

Hamilton, W., et al., "Inductive Representation Learning on Large Graphs," $31^{st}$ Conference on Neural Information Processing Systems (NIPS), Sep. 2018, 19 pages.

Ying, R., et al., "Hierarchical Graph Representation Learning with Differentiable Pooling," $31^{st}$ Conference on Neural Information Processing Systems (NIPS), Sep. 2018, 11 pages.

Frey, B., et al., "Clustering By Passing Messages Between Data Points," Science Magazine, vol. 315, Issue 5814, Oct. 2007, 5 pages.

Basagni, et al., "Distributed Clustering for Ad Hoc Networks," Proceedings of the $4^{th}$ International Symposium on Parallel Architectures, Algorithms, and Networks, Jun. 1999, 15 pages.

* cited by examiner

DISCOVERY MESSAGE FORMAT 400

| FIELD | COUNT |
|---|---|
| HEADER | 1 |
| PAYLOAD (VISITED OBJECT BLOCK(S)) | VARIABLE |

| HEADER FIELDS | SIZE IN OCTETS |
|---|---|
| AUTHORITY IDENTIFIER | 16 |
| MESSAGE IDENTIFIER | 4 |
| TIME-TO-LIVE | 2 |
| RESERVED | 2 |

| VISITED OBJECT BLOCK FIELDS | SIZE IN OCTETS |
|---|---|
| NODE IDENTIFIER | 16 |
| NUMBER OF MEMBERS | 2 |
| DEGREE | 2 |
| LEADER NODE | 16 |
| TIMESTAMP | 8 |

DYNAMIC NODE CLUSTER DISCOVERY IN AN UNKNOWN TOPOLOGY GRAPH

TECHNICAL FIELD

Various example embodiments relate generally to communication systems and, more particularly but not exclusively, to node group discovery in communication systems.

BACKGROUND

In various communication networks, various communications technologies may be used to support various types of communications.

SUMMARY

In at least some example embodiments, an apparatus includes at least one processor and at least one memory including a set of instructions, wherein the set of instructions is configured to, when executed by the at least one processor, cause the apparatus to receive, by a node, a discovery message including a header and a set of visited object blocks, each of the visited object blocks including respective visited node information associated with a respective visited node visited by the discovery message and determine, by the node based on the discovery message, a cluster leader for the node. In at least some example embodiments, the header includes an authority identifier of an administrative authority for cluster formation, a message identifier of the discovery message, and a time-to-live value for the discovery message. In at least some example embodiments, for at least one of the visited object blocks, the respective visited node information associated with the respective visited node visited by the discovery message includes a node identifier of the visited node, a member count of the visited node, a degree of the visited node, a cluster leader selected by the visited node, and a timestamp. In at least some example embodiments, to determine the cluster leader for the node, the set of instructions is configured to, when executed by the at least one processor, cause the apparatus to determine, by the node, whether to select one of the visited nodes associated with one of the visited object blocks in the discovery message as the cluster leader or whether to select itself as the cluster leader. In at least some example embodiments, the visited object blocks associated with the respective visited nodes include respective degrees of the visited nodes and the cluster leader for the node is determined based on the respective degrees of the visited nodes. In at least some example embodiments, the visited object blocks associated with the respective visited nodes include respective member counts of the visited nodes and the cluster leader for the node is determined based on the respective member counts of the visited nodes. In at least some example embodiments, to determine the cluster leader for the node, the set of instructions is configured to, when executed by the at least one processor, cause the apparatus to determine, by the node based on the discovery message, a set of potential cluster leaders and determine, by the node based on the set of potential cluster leaders, the cluster leader for the node. In at least some example embodiments, the set of potential cluster leaders includes each of the visited nodes visited by the discovery message. In at least some example embodiments, the set of potential cluster leaders is determined based on at least one of a degree parameter or a member count parameter. In at least some example embodiments, the set of potential cluster leaders is determined based on a normalized parameter determined based on normalization of a parameter based on a distance metric. In at least some example embodiments, the distance metric is a latency metric measured from the node. In at least some example embodiments, to determine the cluster leader for the node based on the set of potential cluster leaders, the set of instructions is configured to, when executed by the at least one processor, cause the apparatus to rank, by the node, the potential cluster leaders to form a ranked list of the potential cluster leaders and determine, by the node based on the ranked list of the potential cluster leaders, the cluster leader for the node. In at least some example embodiments, the potential cluster leaders are ranked, to form the ranked list of potential cluster leaders, based on at least one of a parameter or a metric. In at least some example embodiments, the potential cluster leaders are determined based on a normalized parameter determined based on normalization of a parameter based on a metric, and the potential cluster leaders are ranked, to form the ranked list of potential cluster leaders, based on the parameter. In at least some example embodiments, the parameter is a degree parameter or a member count parameter and the metric is a distance metric. In at least some example embodiments, the set of instructions is configured to, when executed by the at least one processor, cause the apparatus to generate, by the node based on the discovery message, a local visited object block for the node, insert, by the node, the local visited object block into the set of visited object blocks of the discovery message to form an updated discovery message, and send, by the node, the updated discovery message. In at least some example embodiments, the updated discovery message is sent toward a link selected uniformly at random from a set of links of the node. In at least some example embodiments, the node is associated with an administrative domain, and the updated discovery message is sent toward a second node in the administrative domain. In at least some example embodiments, the node is associated with a first administrative domain, and the updated discovery message is sent toward a second node in a second administrative domain based on a determination that the node is selected as the cluster leader for the node. In at least some example embodiments, the set of instructions is configured to, when executed by the at least one processor, cause the apparatus to determine, by the node based on a time-to-live value in the header of the discovery message, to drop the discovery message without further forwarding the discovery message.

In at least some example embodiments, a non-transitory computer-readable medium stores a set of instructions configured to cause an apparatus to receive, by a node, a discovery message including a header and a set of visited object blocks, each of the visited object blocks including respective visited node information associated with a respective visited node visited by the discovery message and determine, by the node based on the discovery message, a cluster leader for the node. In at least some example embodiments, the header includes an authority identifier of an administrative authority for cluster formation, a message identifier of the discovery message, and a time-to-live value for the discovery message. In at least some example embodiments, for at least one of the visited object blocks, the respective visited node information associated with the respective visited node visited by the discovery message includes a node identifier of the visited node, a member count of the visited node, a degree of the visited node, a cluster leader selected by the visited node, and a timestamp. In at least some example embodiments, to determine the cluster leader for the node, the set of instructions is configured to cause the apparatus to determine, by the node, whether to select one of the visited nodes associated with one of the visited object blocks in the discovery message as the cluster leader or whether to select itself as the cluster leader. In at least some example embodiments, the visited object blocks associated with the respective visited nodes include respective degrees of the visited nodes and the cluster leader for the node is determined based on the respective degrees of the visited nodes. In at least some example embodiments, the visited object blocks associated with the respective visited nodes include respective member counts of the visited nodes and the cluster leader for the node is determined based on the respective member counts of the visited nodes. In at least some example embodiments, to determine the cluster leader for the node, the set of instructions is configured to cause the apparatus to determine, by the node based on the discovery message, a set of potential cluster leaders and determine, by the node based on the set of potential cluster leaders, the cluster leader for the node. In at least some example embodiments, the set of potential cluster leaders includes each of the visited nodes visited by the discovery message. In at least some example embodiments, the set of potential cluster leaders is determined based on at least one of a degree parameter or a member count parameter. In at least some example embodiments, the set of potential cluster leaders is determined based on a normalized parameter determined based on normalization of a parameter based on a distance metric. In at least some example embodiments, the distance metric is a latency metric measured from the node. In at least some example embodiments, to determine the cluster leader for the node based on the set of potential cluster leaders, the set of instructions is configured to cause the apparatus to rank, by the node, the potential cluster leaders to form a ranked list of the potential cluster leaders and determine, by the node based on the ranked list of the potential cluster leaders, the cluster leader for the node. In at least some example embodiments, the potential cluster leaders are ranked, to form the ranked list of potential cluster leaders, based on at least one of a parameter or a metric. In at least some example embodiments, the potential cluster leaders are determined based on a normalized parameter determined based on normalization of a parameter based on a metric, and the potential cluster leaders are ranked, to form the ranked list of potential cluster leaders, based on the parameter. In at least some example embodiments, the parameter is a degree parameter or a member count parameter and the metric is a distance metric. In at least some example embodiments, the set of instructions is configured to cause the apparatus to generate, by the node based on the discovery message, a local visited object block for the node, insert, by the node, the local visited object block into the set of visited object blocks of the discovery message to form an updated discovery message, and send, by the node, the updated discovery message. In at least some example embodiments, the updated discovery message is sent toward a link selected uniformly at random from a set of links of the node. In at least some example embodiments, the node is associated with an administrative domain, and the updated discovery message is sent toward a second node in the administrative domain. In at least some example embodiments, the node is associated with a first administrative domain, and the updated discovery message is sent toward a second node in a second administrative domain based on a determination that the node is selected as the cluster leader for the node. In at least some example embodiments, the set of instructions is configured to cause the apparatus to determine, by the node based on a time-to-live value in the header of the discovery message, to drop the discovery message without further forwarding the discovery message.

In at least some example embodiments, a method includes receiving, by a node, a discovery message including a header and a set of visited object blocks, each of the visited object blocks including respective visited node information associated with a respective visited node visited by the discovery message and determining, by the node based on the discovery message, a cluster leader for the node. In at least some example embodiments, the header includes an authority identifier of an administrative authority for cluster formation, a message identifier of the discovery message, and a time-to-live value for the discovery message. In at least some example embodiments, for at least one of the visited object blocks, the respective visited node information associated with the respective visited node visited by the discovery message includes a node identifier of the visited node, a member count of the visited node, a degree of the visited node, a cluster leader selected by the visited node, and a timestamp. In at least some example embodiments, determining the cluster leader for the node includes determining, by the node, whether to select one of the visited nodes associated with one of the visited object blocks in the discovery message as the cluster leader or whether to select itself as the cluster leader. In at least some example embodiments, the visited object blocks associated with the respective visited nodes include respective degrees of the visited nodes and the cluster leader for the node is determined based on the respective degrees of the visited nodes. In at least some example embodiments, the visited object blocks associated with the respective visited nodes include respective member counts of the visited nodes and the cluster leader for the node is determined based on the respective member counts of the visited nodes. In at least some example embodiments, determining the cluster leader for the node includes determining, by the node based on the discovery message, a set of potential cluster leaders and determining, by the node based on the set of potential cluster leaders, the cluster leader for the node. In at least some example embodiments, the set of potential cluster leaders includes each of the visited nodes visited by the discovery message. In at least some example embodiments, the set of potential cluster leaders is determined based on at least one of a degree parameter or a member count parameter. In at least some example embodiments, the set of potential cluster leaders is determined based on a normalized parameter determined based on normalization of a parameter based on a distance metric. In at least some example embodiments, the distance metric is a latency metric measured from the node. In at least some example embodiments, determining the cluster leader for the node based on the set of potential cluster leaders includes ranking, by the node, the potential cluster leaders to form a ranked list of the potential cluster leaders and determining, by the node based on the ranked list of the potential cluster leaders, the cluster leader for the node. In at least some example embodiments, the potential cluster leaders are ranked, to form the ranked list of potential cluster leaders, based on at least one of a parameter or a metric. In at least some example embodiments, the potential cluster leaders are determined based on a normalized parameter determined based on normalization of a parameter based on a metric, and the potential cluster leaders are ranked, to form the ranked list of potential cluster leaders, based on the parameter. In at least some example embodiments, the parameter is a degree parameter or a member count parameter and the metric is a distance metric. In at least some example embodiments, the method includes generating, by the node based on the discovery message, a local visited object block for the node, inserting, by the node, the local visited object block into the set of visited object blocks of the discovery message to form an updated discovery message, and sending, by the node, the updated discovery message. In at least some example embodiments, the updated discovery message is sent toward a link selected uniformly at random from a set of links of the node. In at least some example embodiments, the node is associated with an administrative domain, and the updated discovery message is sent toward a second node in the administrative domain. In at least some example embodiments, the node is associated with a first administrative domain, and the updated discovery message is sent toward a second node in a second administrative domain based on a determination that the node is selected as the cluster leader for the node. In at least some example embodiments, the method includes determining, by the node based on a time-to-live value in the header of the discovery message, to drop the discovery message without further forwarding the discovery message.

In at least some example embodiments, an apparatus includes means for receiving, by a node, a discovery message including a header and a set of visited object blocks, each of the visited object blocks including respective visited node information associated with a respective visited node visited by the discovery message and means for determining, by the node based on the discovery message, a cluster leader for the node. In at least some example embodiments, the header includes an authority identifier of an administrative authority for cluster formation, a message identifier of the discovery message, and a time-to-live value for the discovery message. In at least some example embodiments, for at least one of the visited object blocks, the respective visited node information associated with the respective visited node visited by the discovery message includes a node identifier of the visited node, a member count of the visited node, a degree of the visited node, a cluster leader selected by the visited node, and a timestamp. In at least some example embodiments, the means for determining the cluster leader for the node includes means for determining, by the node, whether to select one of the visited nodes associated with one of the visited object blocks in the discovery message as the cluster leader or whether to select itself as the cluster leader. In at least some example embodiments, the visited object blocks associated with the respective visited nodes include respective degrees of the visited nodes and the cluster leader for the node is determined based on the respective degrees of the visited nodes. In at least some example embodiments, the visited object blocks associated with the respective visited nodes include respective member counts of the visited nodes and the cluster leader for the node is determined based on the respective member counts of the visited nodes. In at least some example embodiments, the means for determining the cluster leader for the node includes means for determining, by the node based on the discovery message, a set of potential cluster leaders and means for determining, by the node based on the set of potential cluster leaders, the cluster leader for the node. In at least some example embodiments, the set of potential cluster leaders includes each of the visited nodes visited by the discovery message. In at least some example embodiments, the set of potential cluster leaders is determined based on at least one of a degree parameter or a member count parameter. In at least some example embodiments, the set of potential cluster leaders is determined based on a normalized parameter determined based on normalization of a parameter based on a distance metric. In at least some example embodiments, the distance metric is a latency metric measured from the node. In at least some example embodiments, the means for determining the cluster leader for the node based on the set of potential cluster leaders includes means for ranking, by the node, the potential cluster leaders to form a ranked list of the potential cluster leaders and means for determining, by the node based on the ranked list of the potential cluster leaders, the cluster leader for the node. In at least some example embodiments, the potential cluster leaders are ranked, to form the ranked list of potential cluster leaders, based on at least one of a parameter or a metric. In at least some example embodiments, the potential cluster leaders are determined based on a normalized parameter determined based on normalization of a parameter based on a metric, and the potential cluster leaders are ranked, to form the ranked list of potential cluster leaders, based on the parameter. In at least some example embodiments, the parameter is a degree parameter or a member count parameter and the metric is a distance metric. In at least some example embodiments, the apparatus includes means for generating, by the node based on the discovery message, a local visited object block for the node, means for inserting, by the node, the local visited object block into the set of visited object blocks of the discovery message to form an updated discovery message, and means for sending, by the node, the updated discovery message. In at least some example embodiments, the updated discovery message is sent toward a link selected uniformly at random from a set of links of the node. In at least some example embodiments, the node is associated with an administrative domain, and the updated discovery message is sent toward a second node in the administrative domain. In at least some example embodiments, the node is associated with a first administrative domain, and the updated discovery message is sent toward a second node in a second administrative domain based on a determination that the node is selected as the cluster leader for the node. In at least some example embodiments, the apparatus includes means for determining, by the node based on a time-to-live value in the header of the discovery message, to drop the discovery message without further forwarding the discovery message.

In at least some example embodiments, an apparatus includes at least one processor and at least one memory including a set of instructions, wherein the set of instructions is configured to, when executed by the at least one processor, cause the apparatus to determine, by a node based on a message creation probability, to send a discovery message, generate, by the node, the discovery message, wherein the discovery mesage includes a header and a visited object block, select, by the node from a set of links of the node, a selected link for the discovery message, and send, by the node on the selected link, the discovery message. In at least some example embodiments, a non-transitory computer-readable medium stores a set of instructions configured to cause an apparatus to determine, by a node based on a message creation probability, to send a discovery message, generate, by the node, the discovery message, wherein the discovery message includes a header and a visited object block, select, by the node from a set of links of the node, a selected link for the discovery message, and send, by the node on the selected link, the discovery message. In at least some example embodiments, a method includes determining, by a node based on a message creation probability, to send a discovery message, generating, by the node, the discovery message, wherein the discovery message includes a header and a visited object block, selecting, by the node from a set of links of the node, a selected link for the discovery message, and sending, by the node on the selected link, the discovery message. In at least some example embodiments, an apparatus includes means for determining, by a node based on a message creation probability, to send a discovery message, means for generating, by the node, the discovery message, wherein the discovery message includes a header and a visited object block, means for selecting, by the node from a set of links of the node, a selected link for the discovery message, and means for sending, by the node on the selected link, the discovery message.

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical elements that are common among the various figures.

DETAILED DESCRIPTION

Figure 1:
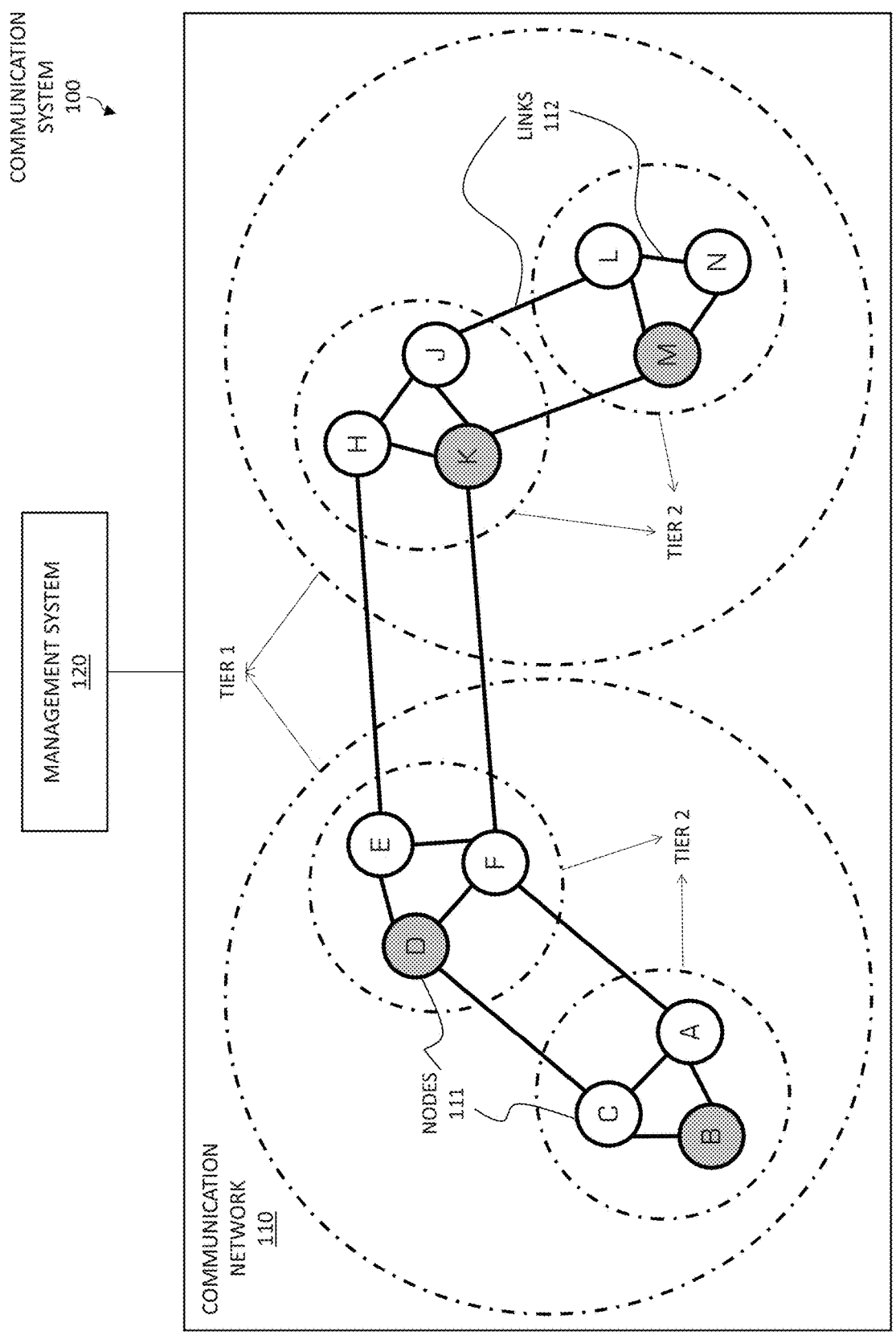
FIG. 1 depicts an example embodiment of a communication system configured to support use of node clustering for supporting services.

Various example embodiments for supporting dynamic node cluster discovery in a communication network are presented. Various example embodiments for supporting dynamic node cluster discovery in a communication network may be configured to support dynamic, multi-level node cluster discovery. Various example embodiments for supporting dynamic node cluster discovery in a communication network may be configured to support dynamic node cluster discovery based on circulation of discovery messages within the communication network. Various example embodiments for supporting dynamic node cluster discovery based on the circulation of discovery messages within the communication network may be configured to support dynamic node cluster discovery based on probabilistic forwarding of discovery messages within the communication network. Various example embodiments for supporting dynamic node cluster discovery based on the circulation of discovery messages within the communication network may be configured to support dynamic node cluster discovery based on updating and forwarding of discovery messages among nodes within the communication network (e.g., based on inclusion of information within the discovery messages by the nodes as the discovery messages are circulated and randomized forwarding of the discovery messages by nodes), processing of discovery messages by nodes of the communication network for enabling the nodes of the communication network to discover and select cluster leaders of node clusters (e.g., based on analysis of information included within the discovery messages by nodes as the discovery messages are circulated), or the like, as well as various combinations thereof. Various example embodiments for supporting dynamic node cluster discovery in a communication network may be configured to support dynamic node cluster discovery based on various clustering criteria (e.g., parameters, metrics, or the like, as well as various combinations thereof) which may be used in various ways (e.g., add to discovery messages, used for evaluating information in discovery messages, or the like, as well as various combinations thereof) in order to support dynamic node cluster discovery in the communication network. Various example embodiments for supporting dynamic node cluster discovery in a communication network may be configured to support dynamic node cluster discovery based on one or more clustering parameters (e.g., a degree parameter indicative of a number neighbor nodes to which a given node is connected, a member count parameter indicative of a number of nodes which would be members of a cluster if the node itself is selected as a cluster leader for the cluster, or the like, as well as various combinations thereof). Various example embodiments for supporting dynamic node cluster discovery in a communication network may be configured to support dynamic node cluster discovery based on one or more clustering metrics (e.g., a distance metric such as a packet transmission latency metric (e.g., for clustering based on packet transmission latency similarity) or other suitable distance metric, one or more other clustering metrics, or the like, as well as various combinations thereof). Various example embodiments for supporting dynamic node cluster discovery in a communication network may be configured to support dynamic node cluster discovery based on various combinations of clustering criteria which may be applied in various ways for dynamic node cluster discovery (e.g., in a particular order, with a particular weighting, with respect to various thresholds, or the like, as well as various combinations thereof). It will be appreciated that these as well as various other example embodiments, and associated advantages or potential advantages, may be further understood by first considering a communication system that is configured to support dynamic node cluster discovery in a communication network.

FIG. 1 depicts an example embodiment of a communication system configured to support use of node clustering for supporting services.

The communication system 100 is configured to support use of node clustering for supporting services. The communication system 100 includes a communication network 110 and a management system 120 configured to support management of the communication network 110.

The communication network 110 may include any suitable type of communication network in which nodes may be clustered for supporting services (e.g., Internet Protocol (IP) networks such as IPv4 or IPv6 networks, Multiprotocol Label Switching (MPLS) networks, IP/MPLS networks such as IPv4/MPLS or IPv6/MPLS networks, or the like). The communication network 110 includes a set of nodes 111 interconnected by a set of communication links 112. The nodes 111 are labeled as nodes A, B, C, D, E, F, H, J, K, L, M, and N for ease of reference. The nodes 111 may include any suitable types of devices which may be clustered for supporting services (e.g., routers, switches, or the like).

The management system 120 may be configured to provide various management functions for the communication network 110. The management system 120 may be configured to provide management functions such as network management, element management, cluster management, or the like, as well as various combinations thereof. It will be appreciated that, while primarily presented with respect to use of a single management system 120 for managing the communication network 110, the communication network 110 may be managed by multiple management systems. For example, functions described herein as being supported by the management system 120 may be performed by or distributed across multiple management systems in a non-hierarchical manner or a hierarchical manner. For example, each tier of the communication network 110 may have a network controller associated therewith, which may in turn be managed by a higher level network controller (e.g., management system 120).

The communication system 100 may be configured to support node cluster management functions. For example, the communication system 100 may be configured to support node cluster management functions such as dynamic node cluster discovery, use of node clusters to support various network services which may in turn support various customer services, or the like, as well as various combinations thereof. The communication network 110 may be configured to perform dynamic node cluster discovery and to use node clusters to support various network services which may in turn support various customer services. The management system 120 may be configured to perform management functions in support of dynamic node cluster discovery in the communication network 110 and use of node clusters in the communication network 110 to support various network services which may in turn support various customer services. The communication system 100 may be configured to support various other node cluster management functions.

The communication system 100 may be configured to support node cluster management functions in various communication system contexts for supporting various types of customer services. For example, the communication system 100 may be used for communications of an entity such as an enterprise or an organization (e.g., where nodes may be grouped for supporting more efficient communications on an enterprise or college campus or between such campuses), for supporting industrial automation (e.g., where nodes may be grouped based on latency to form groups of nodes within similar bounded latency response times that can be used to support similar functions or services in support of industrial automation), for supporting hyper-immersive sessions (e.g., where nodes may be grouped based on latency to form latency zones that can support services such as augmented reality (AR), virtual reality (VR), or the like), for supporting edge cloud computing (e.g., where nodes may be grouped to support services that rely on low-latency capabilities which may be provided by edge clouds, such as autonomous driving and hyper-immersive applications such as virtual reality and cloud gaming), or the like, as well as various combinations thereof.

The communication network 110 may be configured to support dynamic node cluster discovery for dynamically determining the clustering of the nodes 111 of the communication network 110. The communication network 110 may be configured to support dynamic node cluster discovery, for dynamically determining clustering of the nodes 111 of the communication network 110, based on circulation of discovery messages amongst the nodes 111 of the communication network 110 in a manner enabling the nodes 111 to form clusters in a dynamic and distributed manner. The communication network 110 may be configured to support dynamic node cluster discovery based on updating and forwarding of discovery messages among nodes 111 within the communication network 110 (e.g., based on inclusion of information within the discovery messages by the nodes 111 and randomized forwarding of the discovery messages by nodes 111 for circulating the discovery messages within the communication network 110), processing of discovery messages by nodes 111 of the communication network 110 for enabling the nodes 111 of the communication network 110 to discover and select cluster leaders of node clusters (e.g., based on analysis of information included within the discovery messages by nodes 111 as the discovery messages are circulated), or the like, as well as various combinations thereof. It is noted that clusters also may be referred to herein as a groups and that discovery messages also may be referred to herein as cluster discovery messages or group discovery messages. The communication network 110 may be configured to support dynamic node cluster discovery based on use of an algorithm referred to herein as an Autonomous Group Discovery (AGD) algorithm and it will be appreciated that various aspects of dynamic node cluster discovery presented herein may be provided within the context of the AGD algorithm.

The communication network 110 may be configured to support dynamic node cluster discovery based on various clustering criteria (e.g., parameters, metrics, or the like, as well as various combinations thereof) which may be used in various ways (e.g., add to discovery messages, used for evaluating information in discovery messages, or the like, as well as various combinations thereof) in order to support dynamic node cluster discovery in the communication network 110. The communication network 110 may be configured to support dynamic node cluster discovery based on one or more clustering parameters (e.g., a degree parameter indicative of a number neighbor nodes to which a given node is connected, a member count parameter indicative of a number of nodes which would be members of a cluster if the node itself is selected as a cluster leader for the cluster, or the like, as well as various combinations thereof). The communication network 110 may be configured to support dynamic node cluster discovery based on one or more clustering metrics (e.g., a distance metric such as a packet transmission latency metric (e.g., for clustering based on packet transmission latency similarity) or other suitable distance metric, one or more other clustering metrics, or the like, as well as various combinations thereof). The communication network 110 may be configured to support dynamic node cluster discovery based on various combinations of clustering criteria which may be applied in various ways for dynamic node cluster discovery (e.g., in a particular order, with a particular weighting, with respect to various thresholds, or the like, as well as various combinations thereof).

The communication network 110 may be configured to dynamically modify node clusters over time to support various network services which may in turn support various end user services. The network services may be reliant on various types of criteria (e.g., jitter, latency, or the like, as well as various combinations thereof), at least some of which may change dynamically within the communication network 110 over time (e.g., based on network configuration changes, real-time conditions of the network traffic, or the like, as well as various combinations thereof). The communication network 110 may be configured to dynamically modify node clusters over time based on changes to the criteria of the network services, which are used as the basis for node clustering, over time (e.g., initiating re-computation of node clusters periodically (e.g., every five minutes, every thirty minutes, or the like), in response to network conditions (e.g., addition or removal of nodes, indications of network degradation or failure, or the like), or the like, as well as various combinations thereof. The communication network 110 may be configured to dynamically modify node clusters by continuously computing node clusters and maintaining instances of the node clusters based on the criteria of interest related to the provided network services. The communication network 110 may be configured to dynamically modify node clusters over time in various other ways in order to support various network services which may in turn support various end user services.

The nodes 111, when put in service, may select themselves as the cluster leader initially. The nodes 111 then generate discovery messages and send the discovery messages within the communication network 110 and, as the discovery messages circulate among the nodes 111, the nodes 111 will update the selected cluster leaders based on processing of the discovery messages to arrive at the clustering of the nodes 111 of the communication network 110.

The nodes 111 generate discovery messages and send the discovery messages within the communication network 110 to support clustering of the nodes 111 of the communication network 110. The discovery messages circulate within the communication network 110 and the nodes 111 of the communication network 110 receive the discovery messages and process the discovery messages for supporting clustering of the nodes 111 of the communication network 110.

The discovery message that is initiated by a node 111 may be initiated by the node 111 in various ways. The discovery message may be initiated by determining whether to send a discovery message based on a set probability and, based on a decision to send discovery message, selecting one of the links of the node 111 on which to send the discovery message. The discovery message may be initiated at every predefined time interval on average with a set probability. The discovery messages may be initiated in response to a detected condition (e.g., in response to detection of a network topology change in the communication network 110, in response to detection of a traffic-related condition in the communication network 110, in response to detection of a fault or failure in the communication network 110, or the like, as well as various combinations thereof). The discovery message may be initiated by setting one or more quality-of-service indicators (e.g., Differential Services Code Point (DSCP) bits for IP packets) such that zone-specific cluster discovery can be made for a given level of quality of service.

The discovery message that is initiated by a node 111, as indicated above, may be initiated by determining, by the node based on a message creation probability, to send a discovery message, generating, by the node, the discovery message where the discovery message includes a header and a visited object block, selecting, by the node from a set of links of the node, a selected link on which to send the discovery message, and sending, by the node on the selected link, the discovery message. The message creation probability for controlling whether a discovery message is created may be set in various ways. The selected link on which a generated discovery message is sent may be selected in various ways. For example, the selected link on which the generated discovery message is sent may be selected randomly from a full set of available links of the node 111, randomly from a subset of available links of the node 111 where the subset of available links of the node 111 may be set in various ways (e.g., based one or more parameters associated with the links of the node 111 (e.g., indications as to which links are associated with neighbors, node degree, or the like), based on one or more parameters associated with the links of the node 111 (e.g., indications as to which links are associated with neighbors, node degree, or the like), or the like, as well as various combinations thereof. It is noted that the manner in which the outgoing (selected) link for the discovery message is selected may be performed in a manner for impacting the overall performance in regard to not wasting network bandwidth for redundant information (e.g., do not keep sending to a leaf neighbor at the same rate as another neighbor that has ten other connections).

The discovery message that is initiated by a node 111, as indicated above, may be initiated at every predefined time interval on average with a set probability.

The predefined time interval for sending discovery messages may be set in various ways. The predefined interval may be an average interval (e.g., if an example embodiment chooses to pick the time to send randomly with a given mean then, on average, each node will be sending out messages with the given interval (e.g., to spread out transmissions to avoid all the nodes 111 from sending at once.) The predefined time interval could be set empirically or with additional level of automation. The predefined time interval could be determined based on the size of the communication network 110, the length of time each discovery message will circulate within communication network 110 (referred to herein as a time-to-live (TTL) parameter), or the like, as well as various combinations thereof. The predefined time interval could be every ten seconds, every minute, every five minutes, or the like. The predefined time interval for sending discovery messages may be set in various other ways.

The probability for sending discovery messages may be set in various ways. The node 111 may use the same probability for each of the links of the node 111. The node 111 may use varying probabilities for different links of the node 111. For example, the node 111 may give a higher probability to links with higher incoming traffic (e.g., so that transaction cycles are not wasted with many discovery message exchanges with leaf nodes 111). The probability for sending discovery messages may be set in various other ways.

It will be appreciated that an implementation may assure that each node 111 receives at least a set number of messages from which it can determine the members within a latency diameter with a set statistical confidence level. To tune the probability of a node 111 for starting a new discovery message and to tune the TTL value, appearances of the nodes 111 within discovery messages can be logged as an operational test and these logs can later be analyzed to make sure that the number of occurrences is within a given statistical confidence interval.

The discovery message that is initiated by a node 111, as indicated above, may be initiated in response to detection of a condition at the node 111 (e.g., a topology change such as addition of a new node or removal of an existing node, a fault or a failure in the network, a traffic-related condition in the network, or the like).

It is noted that the timing of the discovery messages (e.g., for determining transmission of the discovery messages and processing of temporal information included within or otherwise determined based on the discovery messages) may be based on use of a time synchronization protocol running on the nodes 111 (e.g., Network Time Protocol (NTP) version 4, Institute of Electrical and Electronics Engineers (IEEE) 1588 time synchronization protocols, or the like).

It will be appreciated that at least some such settings for controlling transmission of discovery messages may determine how quickly the communication network 110 will converge to form the clusters, the statistical confidence level of the accuracy of the clusters that are formed, the number of discovery messages expected to circulate in the communication network 110 (e.g., the absolute number of discovery messages, the number of discovery messages relative to the network traffic load, or the like) in order for the communication network 110 to converge to form the clusters, or the like, as well as various combinations thereof.

The discovery message that is initiated by a node 111 includes an administrative authority identifier of an administrative authority of the communication network 110 (e.g., an identifier of management system 120 where the management system 120 is the administrative authority or an identifier of any other suitable administrative authority), a message identifier of the discovery message, and a TTL value. The administrative authority of the communication network 110 may be any entity or device. The TTL value may be a time (e.g., a length of time for which the discovery message may be forwarded within the communication network 110 before being dropped by a receiving node 111), a hop count (e.g., a number of times the discovery message may be forwarded within the communication network 110 before being dropped by a receiving node 111), or the like. The administrative authority identifier of the communication network 110, the message identifier of the discovery message, and the TTL value may be considered to form a header of the discovery message or a portion of a header of the discovery message.

The discovery message that is initiated by a node 111 may include a visited object block generated by the node 111. The visited object block generated by the node 111 includes visited node information for the node 111. The visited node information for the node 111 that is included in the visited object block may include a unique node identifier of the node 111, the member count of the node 111, the identifier of the cluster leader selected by the node 111, the degree of the node 111, and the current time. The unique node identifier of the node 111 e.g., an IP address or other suitable type of unique identifier) enables unique identification of the node 111 within the communication network 110 and may be assigned by the administrative authority or any other suitable entity. The member count of the node 111 includes a count of the number of nodes 111 that would be in the cluster if the node 111 was the cluster leader (e.g., based on a metric or parameter, such as based on a distance metric such as latency or any other suitable metric or parameter). The degree of the node 111 is the number of neighbor nodes 111 to which the node 111 is connected. It will be appreciated that the information may be organized within the visited object block in other ways, that the visited object block may include other types of information, or the like, as well as various combinations thereof.

The discovery message that is initiated by a node 111 may be circulated within the communication network 110 such that it is received, processed, and forwarded by nodes 111 of the communication network 110, thereby enabling dynamic, distributed determination of clustering of the nodes 111 of the communication network 110.

The node 111 that receives a discovery message may perform various functions in response to receipt of the discovery message. The discovery message that is received may include a header and a set of visited object blocks. Here, it will be appreciated that the set of visited object blocks of a received discovery message may include one or more visited object blocks depending on the number of visited nodes that were visited by the discovery message before the discovery message was received by the nodes 111. The node 111, based on the discovery message, may determine information based on the discovery message, select a cluster leader based on the discovery message, determine whether to forward the discovery message and forward the discovery message (including its own visited object block) based on a determination to forward the discovery message, or the like, as well as various combinations thereof.

The node 111 that receives a discovery message determines information based on the discovery message. The information that is determined by the node 111 based on the discovery message may include information which may be included in the discovery message by the node 111 if the discovery message is to be further forwarded by the node 111 (e.g., information which may be included in a visited object block which may be added to the discovery message by the node 111 if the discovery message is to be further forwarded by the node 111), information which may be used by the node 111 for selecting a cluster leader, or the like, as well as various combinations thereof.

The node 111 may use the discovery message to determine latency to other nodes 111. The node 111 may determine latency to other nodes 111 based on the current time values included in the visited object blocks of nodes 111 that are included in the discovery message. It is noted that since the messages are randomly circulating, after receiving a certain number of discovery messages over time, a node 111 is able to accurately determine the distances to other nodes 111 within its vicinity (not necessarily only its direct neighbors). It will be appreciated that this latency information may be used in various ways, including being used by the node 111 to determine a cluster leader for the node 111.

The node 111 may use the discovery message to determine its member count of the number of member nodes 111 that would be in its cluster if it was a cluster leader. The member count may be determined based on any suitable metric or parameter (e.g., a distance metric such as latency or any other suitable metric or parameter). For example, member count may be computed as the number of nodes 111 for which the latency between the node 111 and the potential member satisfies a threshold.

It will be appreciated that the node 111 may determine various other types of information based on the discovery message (e.g., for use in forwarding of an updated discovery message, for use in selecting a cluster leader for the node 111, or the like, as well as various combinations thereof).

The node 111 that receives a discovery message determines whether further forwarding of the discovery message within the communication network 110 is permitted. The node 111 that receives a discovery message determines whether further forwarding of the discovery message within the communication network 110 is permitted based on the TTL in the header of the discovery message (e.g., a determination as to whether the TTL is greater than zero or has some other value indicative as to whether the discovery message has expired or should continue to be circulated within the communication network 110). It is noted that the determination as to whether the discovery message is to be further forwarded may be made before or after the node 111 decrements the TTL in the received discovery message. The node 111, upon determining that the discovery message is not to be further forwarded in the communication network 110, prevents further forwarding of the discovery message in the communication network 110. The node 111, upon determining that the discovery message is to be further forwarded by the node 111, updates the discovery message to form an updated discovery message and forwards the updated discovery message.

The node 111 may update the discovery message to form the updated discovery message by generating a visited object block and adding the visited object block to the discovery message. The visited object block may be added to the discovery message by appending the visited object block to the end of any other visited object blocks already included in the discovery message when the discovery message was received by the node 111 (i.e., visited object blocks previously added to the discovery message by other nodes 111 that had previously received and forwarded the discovery message).

The visited object block that is generated by the node 111 and added to the discovery message to form the updated discovery message may include visited node information for the node 111, which may include a unique node identifier of the node 111, the member count of the node 111, the identifier of the cluster leader selected by the node 111, the degree of the node 111, and the current time (which also may be referred to herein as a timestamp). The unique node identifier of the node 111 enables unique identification of the node 111 within the communication network (e.g., an IP address or other suitable type of unique identifier) and may be assigned by the administrative authority or any other suitable entity. The member count of the node 111 includes a count of the number of nodes 111 that would be in the cluster if the node 111 was the cluster leader (e.g., based on a distance metric or other suitable metric or parameter). The degree of the node 111 is the number of neighbor nodes to which the node is connected. It will be appreciated that the information may be organized within the visited object block in other ways, that the visited object block may include other types of information, or the like, as well as various combinations thereof.

The node 111 may forward the updated discovery message in a number of ways. The node 111 may forward the updated discovery message via a link of the node 111 that is selected uniformly at random from the set of links of the node 111. The node 111 may forward the updated discovery message to a neighbor node 111 that is in the same administrative domain as the node 111 (e.g., selecting uniformly at random from links to nodes 111 that are in the same administrative domain as the node 111). The node 111 may forward the updated discovery message to the neighbor node 111 that is in the same administrative domain as the node 111 based on a determination by the node 111 that the node 111 is not selected as a cluster leader. The node 111 may forward the updated discovery message to a neighbor node 111 that is in a different administrative domain than the node 111 (e.g., selecting uniformly at random from links to nodes 111 that are not in the same administrative domain as the node 111). The node 111 may forward the updated discovery message to the neighbor node 111 that is in a different administrative domain than the node 111 based on a determination that the node 111 is selected as a cluster leader. It will be appreciated that the node 111 may forward the updated discovery message to the neighbor node 111 in various other ways.

The node 111 that receives a discovery message uses the discovery message to determine a cluster leader for itself. The determination of the cluster leader effectively associates the node 111 with the cluster with which the cluster leader is associated. The node 111 may select one of the nodes 111 having a visited object block in the payload of the discovery message as the cluster leader or may select itself as the cluster leader. The node 111 may select the cluster leader based on various parameters, metrics, or the like, as well as various combinations thereof. The node 111 may determine a cluster leader by determining a set of potential cluster leaders and determining the cluster leader based on the set of potential cluster leaders. It will be appreciated that the set of potential cluster leaders may be determined in various ways, the determination of the cluster leader based on the set of potential cluster leaders may be performed in various ways, or the like, as well as various combinations thereof. The set of potential cluster leaders may include one or more of the nodes 111 having a visited object block in the payload of the discovery message. The set of potential cluster leaders may include each of the nodes 111 having a visited object block in the payload of the discovery message or a subset of the nodes 111 having a visited object block in the payload of the discovery message. The set of potential cluster leaders may be determined by evaluating each of the nodes 111 having a visited object block in the payload of the discovery message based on a parameter or metric. The set of potential cluster leaders may be determined by evaluating each of the nodes 111 having a visited object block in the payload of the discovery message based on information included in the visited object blocks of the nodes 111, information independent of the visited object blocks of the nodes 111, or the like, as well as various combinations thereof For example, the set of potential cluster leaders may be determined based on a distance metric. The set of potential cluster leaders may be determined by evaluating each node 111 having a visited object block in the payload of the discovery message based on a distance between the node 111 and the node 111 having the visited object block in the payload of the discovery message, respectively. The set of potential cluster leaders may be determined by, for each of the nodes 111 having a visited object block in the payload of the discovery message, determining a distance between the node 111 and the respective node 111 having a visited object block in the payload of the discovery message and selecting the node 111 having a visited object block in the payload of the discovery message for inclusion in the set of potential cluster leaders based on a determination that the distance satisfies (e.g., is less than or less than or equal to) a distance threshold. The distance may be a latency, a number of hops, or the like. The distance may be determined based on information included in the visited object blocks of the nodes 111 (e.g., based on the current time value that is included in the visited object block), information independent of the visited object blocks of the nodes 111, or the like, as well as various combinations thereof.

For example, the set of potential cluster leaders may be determined based on a degree parameter. The set of potential cluster leaders may be determined by evaluating each node 111 having a visited object block in the payload of the discovery message based on a degree of the node 111 as determined from the visited object block of the node 111 in the payload of the discovery message. The set of potential cluster leaders may be determined by, for each of the nodes 111 having a visited object block in the payload of the discovery message, determining a degree of the node 111 having a visited object block in the payload of the discovery message and selecting the node 111 having a visited object block in the payload of the discovery message for inclusion in the set of potential cluster leaders based on a determination that the degree satisfies (e.g., greater than or equal to or greater than) a degree threshold.

For example, the set of potential cluster leaders may be determined based on a member count parameter. The set of potential cluster leaders may be determined by evaluating each node 111 having a visited object block in the payload of the discovery message based on a member count of the node 111 as determined from the visited object block of the node 111 in the payload of the discovery message. The set of potential cluster leaders may be determined by, for each of the nodes 111 having a visited object block in the payload of the discovery message, determining a member count of the node 111 having a visited object block in the payload of the discovery message and selecting the node 111 having a visited object block in the payload of the discovery message for inclusion in the set of potential cluster leaders based on a determination that the member count satisfies (e.g., greater than or equal to or greater than) a member count threshold.

It is noted that the node 111 itself may or may not be considered to be part of the set of potential cluster leaders. For example, where the node 111 is part of the set of potential cluster leaders, the node 111 may be evaluated against one or more other nodes 111 selected for inclusion in the set of potential cluster leaders based on the visited object blocks in the payload of the discovery message (e.g., the node 111 may be ranked along with the other nodes 111 of the set of potential cluster leaders and evaluated in conjunction with the other nodes 111 of the set of potential cluster leaders based on one or more parameter or metrics for determining the cluster leader). For example, when the node 111 is not part of the set of potential cluster leaders, the node 111 may be selected as the cluster leader by default based on a determination that none of the nodes 111 in the set of potential cluster leaders is selected as the cluster leader (e.g., based on a determination that none of the nodes 111 in the set of potential cluster leaders, based on evaluation of the nodes 111 in the set of potential cluster leaders based on one or more parameter or metrics, satisfies one or more conditions for selection as the cluster leader).

It will be appreciated that the set of potential cluster leaders may be determined in various other ways.

The determination of the cluster leader based on the set of potential cluster leaders may be performed in various ways.

The determination of the cluster leader based on the set of potential cluster leaders may be performed by evaluating the potential cluster leaders based on one or more parameters, one or more metrics, or the like, as well as various combinations thereof. For example, the cluster leader may be selected as the potential cluster leader having a greatest degree as determined from the visited object blocks of the potential cluster leaders in the payload of the discovery message (or the node 111 itself if the degree of the node 111 itself is greater than the degrees of the potential cluster leaders associated with the visited object blocks in the payload of the discovery message). For example, the cluster leader may be selected as the potential cluster leader having a greatest member count as determined from the visited object blocks of the potential cluster leaders in the payload of the discovery message (or the node 111 itself if the degree of the node 111 itself is greater than the degrees of the potential cluster leaders associated with the visited object blocks in the payload of the discovery message). For example, the cluster leader may be selected as the potential cluster leader having a greatest score determined based on a combination of the degrees and the member counts of the potential cluster leaders as determined from the visited object blocks of the potential cluster leaders in the payload of the discovery message (or the node 111 itself if the score of the node 111 itself is greater than the scores of the potential cluster leaders associated with the visited object blocks in the payload of the discovery message).

The determination of the cluster leader based on the set of potential cluster leaders may be performed by evaluating the potential cluster leaders based on one or more normalized parameters, one or more normalized metrics, or the like, as well as various combinations thereof. The selection of the cluster leader based on the set of potential cluster leaders may be performed by evaluating the potential cluster leaders based on a parameter (e.g., degree, member count, or the like) based on one or more metrics (e.g., distance such as latency or other suitable metrics). For example, the selection of the cluster leader based on the set of potential cluster leaders may be performed by computing a normalized degree for each of the potential cluster leaders (e.g., by dividing the degree of the potential cluster leader as determined from the visited object block of the potential cluster leader by a distance between the node 111 and the potential cluster leader) and selecting one of the potential cluster leaders having the greatest normalized degree as the cluster leader. For example, the selection of the cluster leader based on the set of potential cluster leaders may be performed by computing a normalized member count for each of the potential cluster leaders (e.g., by dividing the member count of the potential cluster leader as determined from the visited object block of the potential cluster leader by a distance between the node 111 and the potential cluster leader) and selecting one of the potential cluster leaders having the greatest normalized member count as the cluster leader. It will be appreciated that the node 111 itself also may be selected (e.g., based on a determination that none of the normalized parameter values computed for the potential cluster leaders satisfies a threshold). It will be appreciated that other parameters may be used, other metrics may be used for normalizing parameters, multiple such normalized parameters may be applied in various ways (e.g., linearly in different orders, using weighting, or the like), or the like, as well as various combinations thereof.

The determination of the cluster leader based on the set of potential cluster leaders may be performed by ranking the potential cluster leaders to form a ranked list of potential cluster leaders and selecting the cluster leader based on the ranked list of potential cluster leaders.

The potential cluster leaders for the node 111 may be ranked in various ways. The potential cluster leaders for the node 111 may be ranked based on various parameters (e.g., a degree parameter, a member count parameter, or the like, as well as various combinations thereof) which may be included within the visited object blocks of the discovery message, which may be determined based on information included within the discovery message, or the like, as well as various combinations thereof. The potential cluster leaders for the node 111 may be ranked based on various metrics (e.g., distance metrics such as latency or other suitable distance metrics or other types of metrics). The potential cluster leaders for the node 111 may be ranked based on various normalized parameters which may be normalized based on various metrics (e.g., a normalized degree parameter that is normalized based on latency or other suitable metric, a normalized member count parameter that is normalized based on latency or other suitable metric, or the like, as well as various combinations thereof). The potential cluster leaders for the node 111 may be ranked, to form the ranked list of potential cluster leaders, based on various other parameters, metrics, or the like, as well as various combinations thereof. The potential cluster leaders for the node may be ranked in various other ways.

The cluster leader for the node 111 may be determined based on the ranked list of potential cluster leaders in various ways.

The cluster leader for the node 111 may be determined based on the ranked list of potential cluster leaders by determining whether the node 111 is to select the cluster leader from the ranked list of potential cluster leaders or to whether the node 111 should select itself as the cluster leader.

The cluster leader for the node 111 may be determined based on the ranked list of potential cluster leaders by selecting the highest ranking potential cluster leader in the ranked list of cluster leaders.

The cluster leader for the node 111 may be determined from the ranked list of potential cluster leaders by selecting the highest ranking potential cluster leader in the ranked list of cluster leaders that satisfies a threshold, which may be based on a parameter (e.g., a highest ranking potential cluster leader in the ranked list of cluster leaders having an associated degree that satisfies a degree threshold, a highest ranking potential cluster leader in the ranked list of cluster leaders having an associated member count that satisfies a member count threshold, or the like), a metric (e.g., a highest ranking potential cluster leader in the ranked list of cluster leaders having an associated latency that satisfies a latency threshold), a normalized parameter, or the like, as well as various combinations thereof.

The cluster leader for the node 111 may be determined based on the ranked list of potential cluster leaders by comparing the potential cluster leaders in the ranked list of cluster leaders to the node 111 based on a parameter (e.g., for selecting a highest ranking potential cluster leader having a value of the parameter that is better than a value of the parameter for the node or selecting the node itself if none of the potential cluster leaders has a value of the parameter that is better than the value of the parameter for the node), based on a metric (e.g., for selecting a highest ranking potential cluster leader having a value of the metric that is better than a value of the metric for the node or selecting the node itself if none of the potential cluster leaders has a value of the metric that is better than the value of the metric for the node), based on node identifiers of the nodes (e.g., for determining whether to select one of the potential cluster leaders or the node itself based on a determination that other analysis of the list of potential cluster leaders does not result in selection of the cluster leader for the node, such as where none of the potential cluster leaders satisfies a threshold, none of the potential cluster leaders is determined to be better than the node (e.g., the node is equal to or better than each of the potential cluster leaders when evaluated based on a parameter or metric), or the like, as well as various combinations thereof), or the like, as well as various combinations thereof.

The comparison of the potential cluster leaders to the node 111 may be performed based on the parameter that is used to rank the potential cluster leaders (e.g., evaluating the potential cluster leaders in the ranked list of potential cluster leaders based on a degree parameter where a normalized degree parameter was used to rank the potential cluster leaders to form the ranked list of cluster leaders, evaluating the potential cluster leaders in the ranked list of potential cluster leaders based on a member count parameter where a normalized member count parameter was used to rank the potential cluster leaders to form the ranked list of cluster leaders, or the like).

The comparison of the potential cluster leaders to the node 111 may be performed based on a parameter that is different than the parameter that is used to rank the potential cluster leaders (e.g., evaluating the potential cluster leaders in the ranked list of potential cluster leaders based on a degree parameter where a member count parameter or normalized member count parameter was used to rank the potential cluster leaders to form the ranked list of cluster leaders, evaluating the potential cluster leaders in the ranked list of potential cluster leaders based on a member count parameter where a degree parameter or a normalized degree parameter was used to rank the potential cluster leaders to form the ranked list of cluster leaders, or the like).

The cluster leader for the node 111 may be determined based on the ranked list of potential cluster leaders in various other ways.

The cluster leader for the node 111 may be determined based on various combinations of such analysis mechanisms. For example, the node 111 may determine the cluster leader as follows. The node 111 may determine a set of potential cluster leaders based on latency. The node 111 may then rank the potential cluster leaders according to their normalized degrees (e.g., degree divided by latency distance to the node 111). If the highest-ranking member at the top of the ranked list of potential cluster leaders has a higher degree than the node 111 itself, then the node 111 selects that potential cluster leader as the cluster leader. If there are no nodes 111 with higher degree in the member list, a node 111 ranks the potential cluster leaders according to their normalized member counts (e.g., member count divided by latency distance to the node 111). If the highest-ranking member at the top of the ranked list of potential cluster leaders has a higher member count than the node 111 itself, then the node 111 selects that potential cluster leader as the cluster leader. If none of the conditions hold, the node 111 checks potential cluster leaders that have degrees equal to the degree of the node 111. If there are potential clusters leaders that have equal degree, the node 111 checks if any of the potential cluster leaders with an equal degree has a node identifier that is smaller than it its own node identifier (the comparison can be done by any suitable ranking method). If any of the potential cluster leaders with equal degree has a node identifier that is smaller than the node identifier of node 111, the node 111 selects that potential cluster leader as the cluster leader. If there are potential clusters leaders that have equal member counts, the node 111 checks if any of the potential cluster leaders with an equal member count has a node identifier that is smaller than it its own node identifier (the comparison can be done by any suitable ranking method). If any of the potential cluster leaders with equal member count has a node identifier that is smaller than the node identifier of node 111, the node 111 selects that potential cluster leader as the cluster leader. If none of the cluster leader selection conditions hold, then the node 111 selects itself as the cluster leader and informs the administrative authority accordingly.

It will be appreciated that determination of the cluster leader based on the set of potential cluster leaders may be performed by ranking the potential cluster leader to form a ranked list of potential cluster leaders in various other ways, selecting the cluster leader based on the ranked list of potential cluster leaders in various other ways, or the like, as well as various combinations thereof.

It will be appreciated that the cluster leader may be determined based on the set of potential cluster leaders in various other ways.

It will be appreciated that various combinations of such mechanisms may be applied in various ways for determining the cluster leader for the node 111.

It will be appreciated that, although primarily presented with respect to determining the cluster leader for the node 111 based on use of specific parameters and metrics in a particular manner (e.g., limiting the set of potential cluster leaders that are evaluated based on use of a distance metric based on latency, using parameters in a particular order for ranking potential cluster leaders (e.g., ranking potential cluster leaders based on normalized degree before ranking potential cluster leaders based on normalized member count), using specific parameters for comparing potential cluster leaders to the node 111 (e.g., comparing potential cluster leaders to the node 111 based on specific parameters dependent upon the parameter used as the basis for ranking, such as comparisons based on degree when the potential cluster leaders are ranked based on normalized degree and comparisons based on member count when the potential cluster leaders are ranked based on normalized member count), using parameters in a particular order for comparison of potential cluster leaders when the parameters of the potential cluster leaders and the node 111 are equal (e.g., evaluating potential cluster leaders based on degree before evaluating potential cluster leaders based on member count), using specific parameters for evaluating potential cluster leaders when the parameters of the potential cluster leaders and the node 111 are equal (e.g., using node identifiers and selecting the node 111 having the lowest node identifier), making a particular default cluster leader selection (e.g., selecting the node 111) based on a determination that other conditions are not satisfied, or the like, as well as various combinations thereof), the specified parameters and/or other parameters may be used in various other ways for supporting selection of the cluster leader for the node 111, the specified metrics and/or other metrics may be used in various other ways for supporting selection of the cluster leader for the node 111, or the like, as well as various combinations thereof.

It will be appreciated that, although primarily presented with respect to use of specific mechanisms (e.g., evaluations, based on specific parameters such as degree and member count and specific metrics such as latency, at the nodes 111 based on the discovery messages) as a basis for determining the cluster leader for the node 111, in at least some example embodiments a voting mechanism also or alternatively may be used as a basis for determining the cluster leader for the node 111. For example, in at least some example embodiments, selection of cluster leaders for nodes 111 may be based on a system in which nodes 111 vote for each other or themselves by exchanging voting messages and the voting information is carried within the discovery messages (e.g., in place of node degree where voting is used in place of node degree for node cluster leader discovery or in addition to node degree where voting is used in conjunction with node degree for node cluster leader discovery). When a node 111 learns about a member, the node 111 sends to the member a vote as a prospective cluster leader. The vote may be calculated as follows: (the latency zone distance unit/distance to member)*(1/number of neighbors of the node itself). It will be appreciated that, based on this formula, the closer the two nodes 111 are to each other the higher the vote will be and the more neighbors a node 111 has the lower the vote will be. It will be appreciated that other formulas may be used to calculate the vote that the node 111 sends to the member as a prospective cluster leader. When a node 111 finishes updating the number of members in its potential cluster, the node 111 ranks the members in its potential cluster to form a ranked list of members and then determines, based on the ranked listed of members, whether to vote for one of the members in the ranked list of members to be the cluster leader or whether to select itself to be the cluster leader. The node 111 may rank the members in its potential cluster according to, for each of the members, a respective vote-related measure computed for the respective member in the potential cluster. The vote-related measure that is used to rank the members in the potential cluster of the node 111 may be computed as the average votes the respective member has divided by a normalized distance to the respective member (e.g., the latency zone distance unit/distance to member or using any other suitable normalized distance). The node 111 may determine whether to vote for one of the members in the ranked list of members to be the cluster leader or whether to select itself to be the cluster leader by comparing itself to members in the ranked list of members. The comparison of the node 111 to the members in the ranked list of members may be based on one or more vote-related measures, such as the total number of votes, the average number of votes (e.g., total votes/total members), or the like, as well as various combinations thereof. The node 111 may determine whether to vote for one of the members in the ranked list of members to be the cluster leader or whether to select itself to be the cluster leader by comparing itself to members in the ranked list of members in an order from the highest ranked member to the lowest ranked member until selecting one of the members or, if none of the members are ranked higher than the node 111, selecting itself. If the highest-ranking member at the top of the ranked list of members has a higher ranking than the node 111 itself (e.g., more votes, a larger average vote, or the like), then the node 111 votes for that highest-ranking member as its cluster leader. If the highest-ranking member at the top of the ranked list of members does not have a higher ranking than the node 111 itself, then the node 111 checks the next highest ranking member in the ranked list of members. The node 111 continues to check the members in the ranked list of members until identifying the highest ranking member in the ranked list of members that has a higher ranking than the node 111 or until determining that none of the members in the ranked list of members has a higher ranking than the node 111. The node 111, upon determining that one of the members of the ranked list of members has a higher ranking than the node 111, votes for that one of the members of the ranked list of members to be the cluster leader. The node 111 may vote for one of the members of the ranked list of members to be the cluster leader by sending a message to the one of the members of the ranked list of members indicating that the node 111 is voting for the one of the members of the ranked list of members to be the cluster leader. The node 111, upon determining that none of the members in the ranked list of members has a higher ranking than the node 111, selects itself as the cluster leader and informs the administrative authority. The node 111 may inform the administrative authority that it has selected itself as the cluster leader by sending a message to the administrative authority. It will be appreciated that voting may be applied in various other ways for supporting selection of the cluster leader for the node 111.

It will be appreciated that the cluster leader for the node 111 may be determined in various other ways. For example, the various parameters and/or metrics may be applied in various other ways for supporting selection of the cluster leader for the node 111 (e.g., eliminating the initial filtering of potential cluster leaders based on the metric (e.g., latency)

and considering each of the nodes 111 having a visited object block in the discovery message as being a potential cluster leader, attempting to select the cluster leader based on ranking of potential cluster leaders based on the member count before ranking of potential cluster leaders based on degree, or the like, as well as various combinations thereof), various other parameters may be used in conjunction with or in place of the above-described parameters for supporting selection of the cluster leader for the node 111 (e.g., voting parameters or the like), various other metrics may be used in conjunction with or in place of the above-described metrics for supporting selection of the cluster leader for the node, the various mechanisms for supporting selection of the cluster leader for the node 111 may be performed or applied in various other ways for supporting selection of the cluster leader for the node 111, the various other mechanisms for supporting selection of the cluster leader for the node 111 may be performed or applied for supporting selection of the cluster leader for the node 111, or the like, as well as various combinations thereof.

The node 111 that receives the discovery message, as discussed above, uses the discovery message to determine the cluster leader for itself. The determination of the cluster leader effectively associates the node 111 with the cluster with which the cluster leader is associated. The node 111 may select one of the nodes 111 having a visited object block in the payload of the discovery message as the cluster leader or may select itself as the cluster leader. If the node 111 selects a member node (e.g., a node specified in the discovery message by inclusion of a visited object block) as the cluster leader, the node checks if that member node is a cluster leader itself. If the member node is a cluster leader itself then the node 111 uses that member node as its cluster leader. If the member node is not a cluster leader itself, then the node 111 may follow the chain of leadership references (e.g., in the visited object blocks) to see if there is a cluster leader in the chain of leadership references that is also a member node of the node 111. For example, if node A wants to select node B as its leader but determines that node B itself is not a leader, then node A jumps to the node that node B currently points to as its leader (e.g., node C). At a stable state, the chain of leadership references should end there; however, during a random, transitional state, node A may have to jump from node C to yet another node searching for a node that can be a leader (where it will be appreciated that such node also should be a member of node A if node A is ultimately going to select that node as its leader). If there is a cluster leader in the chain of leadership references that is also a member node of the node 111, then the node uses that cluster leader member node as its cluster leader. If there is no cluster leader in the chain of leadership references that is also a member node of the node 111, then the node 111 may select itself as the cluster leader.

The communication network 110 may be configured to perform dynamic node cluster discovery in an iterative manner in order to support hierarchical node clustering. For example, dynamic node cluster discovery may be run on the nodes 111 to create node clusters at a lowest hierarchical level, dynamic node cluster discovery may be run again on the node clusters (e.g., using the clusters of the level below as "nodes" for clustering at the current level) to provide an initial clustering of the clusters at a next hierarchical layer, and so forth, thereby creating node clusters at multiple hierarchical levels. The nodes 111 may be considered to be members of each of the hierarchical clusters with which they are associated. In the example of FIG. 1, the nodes 111 of the communication network 110 have been organized into clus- ters in two tiers to form a multi-tier hierarchical network. The lower tier, denoted as Tier 2, includes four clusters as follows: (1) a first cluster including nodes A, B, and C with node B operating as the cluster leader, (2) a second cluster including nodes D, E, and F with node D operating as the cluster leader, (3) a third cluster including nodes H, J, and K with node K operating as the cluster leader, and (4) a fourth cluster including nodes L, M, and N with node M operating as the cluster leader. The upper tier, denoted as Tier 1, includes two clusters, each of which includes two of the Tier 2 clusters as sub-clusters as follows: (1) the first Tier 1 cluster includes the [A, B, C] and [D, E, F] clusters as sub-clusters (and, although omitted for purposes of clarity, may have a network controller as its leader) and (2) the second Tier 1 cluster includes the [H, J, K] and [L, M, N] clusters as sub-clusters (and, although omitted for purposes of clarity, may have a network controller as its leader). It will be appreciated that the nodes 111 of the communication network 110 may be clustered into any suitable number of hierarchical layers.

The communication network 110 may be configured to use clusters of nodes 111, which are determined based on dynamic node cluster discovery, in order to support communications within the communication network 110. The communication network 110 may be configured to use clusters of nodes 111 to support communication of traffic based on cluster-oriented routing. The communication network 110 may be configured to use clusters of nodes 111 to support communication of traffic using non-deterministic routing and/or deterministic routing (e.g., deterministic routing using bounded jitter, bounded latency, or the like). The communication network 110 may be configured to use clusters of nodes 111 to support communication of traffic for various types of customer services which may be supported (e.g., voice and data services, factory automation services, edge cloud services, AR/VR services, or the like, as well as various combinations thereof). The communication network 110 may be configured to use clusters of nodes 111, which are determined based on dynamic node cluster discovery, in various other ways.

It will be appreciated that, although primarily presented with respect to application of dynamic node cluster discovery to a communication network for creating a single clustering solution (either non-hierarchical or hierarchical) in the communication network, in at least some example embodiments dynamic node cluster discovery may be applied to the communication network multiple time for creating multiple clustering solutions for the communication network (e.g., based on use of different parameters and/or metrics for determining clustering, based on use of different thresholds for parameters and/or metrics for determining clustering, or the like, as well as various combinations thereof. For example, in cases where the clustering criteria is latency, multiple clustering solutions may be determined for multiple latency zones of interest (e.g., after performing dynamic node cluster discovery, a node may belong to multiple clusters associated with multiple different clustering solutions, such as a first zone with a radius supporting maximum latency of 10 ms, a second zone with a radius supporting maximum latency of 100 ms, and so forth). For example, in cases where clustering is based on the member counts of the nodes (e.g., in terms of the number of members which are part of a given cluster), multiple clustering solutions may be determined for multiple member count thresholds of interest (e.g., clustering nodes such that clusters include no more than five nodes per cluster, clustering nodes so that clusters support no more than ten nodes per cluster, and so forth).

It will be appreciated that, although primarily presented with respect to dynamic node cluster discovery that is based on a specific type of clustering criteria (e.g., node degree, node member count, and packet transmission latency), in at least some example embodiments dynamic node cluster discovery may be performed based on various other types of clustering criteria which may be used for clustering nodes of a communication network.

It will be appreciated that, although primarily described with respect to application of dynamic node cluster discovery to a particular type of communication network (e.g., a communication network having specific types, numbers, and arrangements of nodes), dynamic node clustering discovery may be applied to various other types of communication networks (e.g., communication networks including various other types, numbers, and or arrangements of nodes).

It will be appreciated that various example embodiments of dynamic node cluster discovery as discussed hereinabove with respect to FIG. 1 may be further understood by way of reference to the example of FIG. 2.

Figure 2:
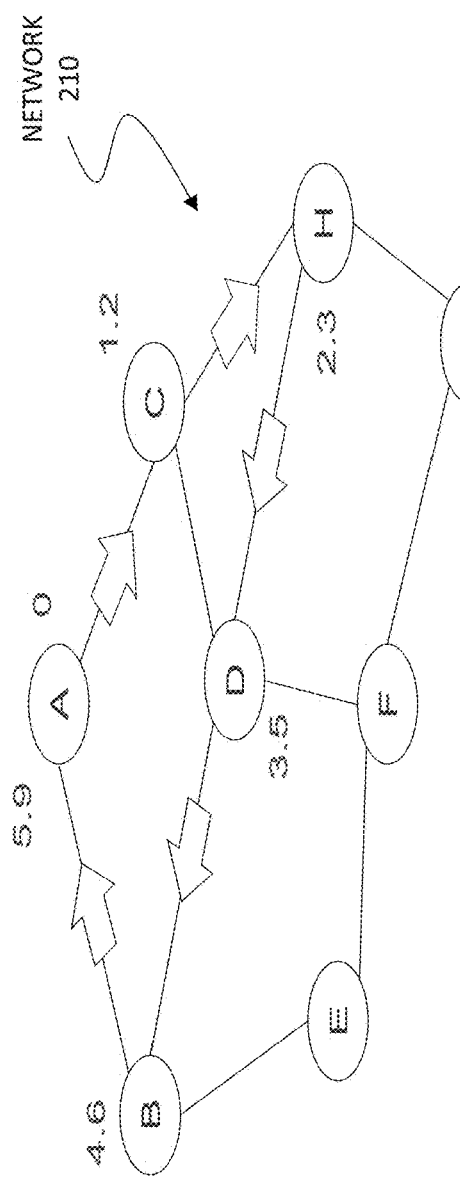
FIG. 2 depicts an example of a communication network for illustrating forwarding of a discovery message and for illustrating contents of the discovery message as the discovery message is forwarded within the communication network.
Figure 2:
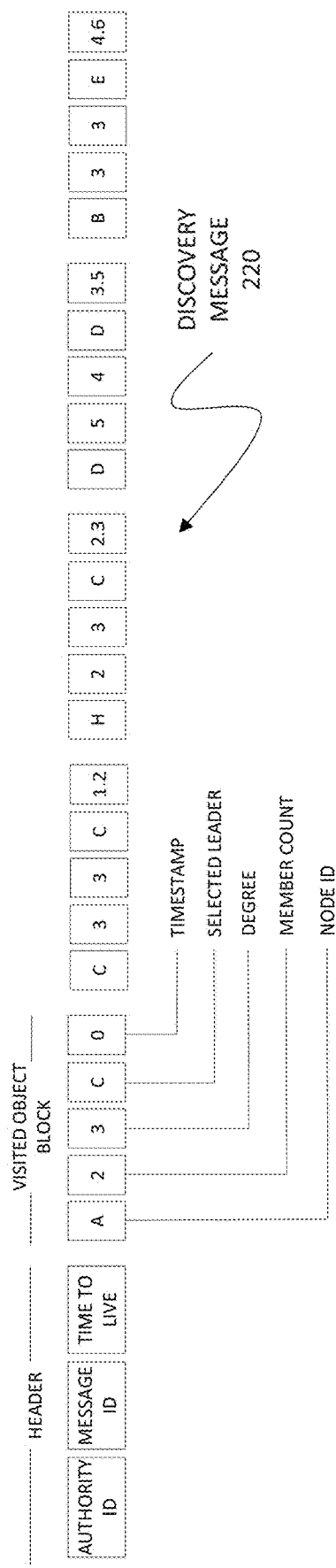

FIG. 2 depicts an example of a communication network for illustrating forwarding of a discovery message and for illustrating contents of the discovery message as the discovery message is forwarded within the communication network.

In the example of FIG. 2, the network 210 includes eight nodes labeled as nodes A, B, C, D, E, F, G, and H.

In the example of FIG. 2, a discovery message is initiated at node A at time 0. Node A generates a header for the discovery message and a visited object block to be included in the payload of the discovery message. In this example, it is assumed that the clusters are formed based on a latency distance of 2 latency units such that, if node A was a group leader, it would have two members within the threshold of 2 latency units—namely, node C since node C is 1.2 units away and node B since node B is 1.3 units away—and, thus, the member count for node A is set to 2 in the visited object block. Node A randomly selects the link to node C and forwards the discovery message to node C. Node C receives the discovery message from node A, processes the discovery message, updates the discovery message to include a visited object block, and forwards the discovery message at time 1.2. The discovery message is then received, processed, and forwarded by nodes H, D, and B, and then back to node A again.

In the example of FIG. 2, the discovery message 220 illustrates the discovery message when the discovery message arrives back at node A. The discovery message 220 that is received back at node A includes the header and the payload, which now includes five visited object blocks. The header for the discovery message was generated by node A. The five visited object blocks include a first visited object block added to the discovery message 220 by node A when the discovery message 220 was first initiated, a second visited object block added to the discovery message 220 by node C when the discovery message 220 was received and forwarded by node C, a third visited object block added to the discovery message 220 by node H when the discovery message 220 was received and forwarded by node H, a fourth visited object block added to the discovery message 220 by node D when the discovery message 220 was received and forwarded by node D, and a fifth visited object block added to the discovery message 220 by node H when the discovery message 220 was received and forwarded by node H In the example of FIG. 2, node A receives the discovery message 220 from node B. Node A uses the received discovery message 220 to determine a cluster leader. For example, Node A may select nodes C, D, and B as potential cluster leaders and then evaluate nodes C, D, and B based on various parameters and/or metrics for determining whether to select one of the potential cluster leaders as its cluster leader or whether to select itself as the cluster leader. For example, node A may determine normalized degree values for the three potential cluster leaders as follows: (1) node C normalized degree=3/1.2=2.5, (2) node D normalized degree=4/2.4=1.7, and (3) node B=3/1.3=2.3. Node A may then rank the potential cluster leaders, based on the normalized degree values, as follows: node C, node B, node D. Node A may then evaluate each of the potential cluster leaders based on a comparison of its own degree against the degrees of the potential cluster leaders. Here, since node A has a degree of 2 and node C has a degree of 3, node A will again select node C as its cluster leader. It is noted that, none of the potential cluster leaders had a degree greater than the degree of node A, then node A could have either selected itself as the cluster leader or could have continued to evaluate the potential cluster leaders based on other parameters and/or metrics (e.g., computing normalized member count values of the potential cluster leaders, ranking the potential cluster leaders based on the normalized member counts of the potential cluster leaders, and then evaluating each of the potential cluster leaders against itself based on member count comparisons. As described herein, node A may apply various parameters and/or metrics in various ways in order to determine a cluster leader based on a received discovery message. Node A may then continue to forward the discovery message 220 or may drop the discovery message 220. For example, Node A may drop the discovery message based on the TTL parameter in the header of the discovery message 220, based on a determination that Node A is the node that generated the discovery message 220 and that the discovery message 220 has circled back to itself, or the like.

It is noted that as nodes continue to receive multiple discovery messages over time, the membership counts will be upgraded to more accurate values over time, thereby resulting in pruning of redundant, longer paths.

It is noted that, although primarily described with respect to discovering a single cluster based on the discovery message (namely, a cluster with a threshold of 2 latency units), multiple clusters may be discovered based on the discovery message. For example, based on discovery message in FIG. 2, node A, in addition to determining that nodes C and B satisfy the latency threshold of 2 units, also may determine that node H is 2.3 units away and, thus, would satisfy a second latency threshold of 3 units (such that a cluster of 3 units long also could be formed at the same time as the original cluster of 2 units long).

Figure 3:
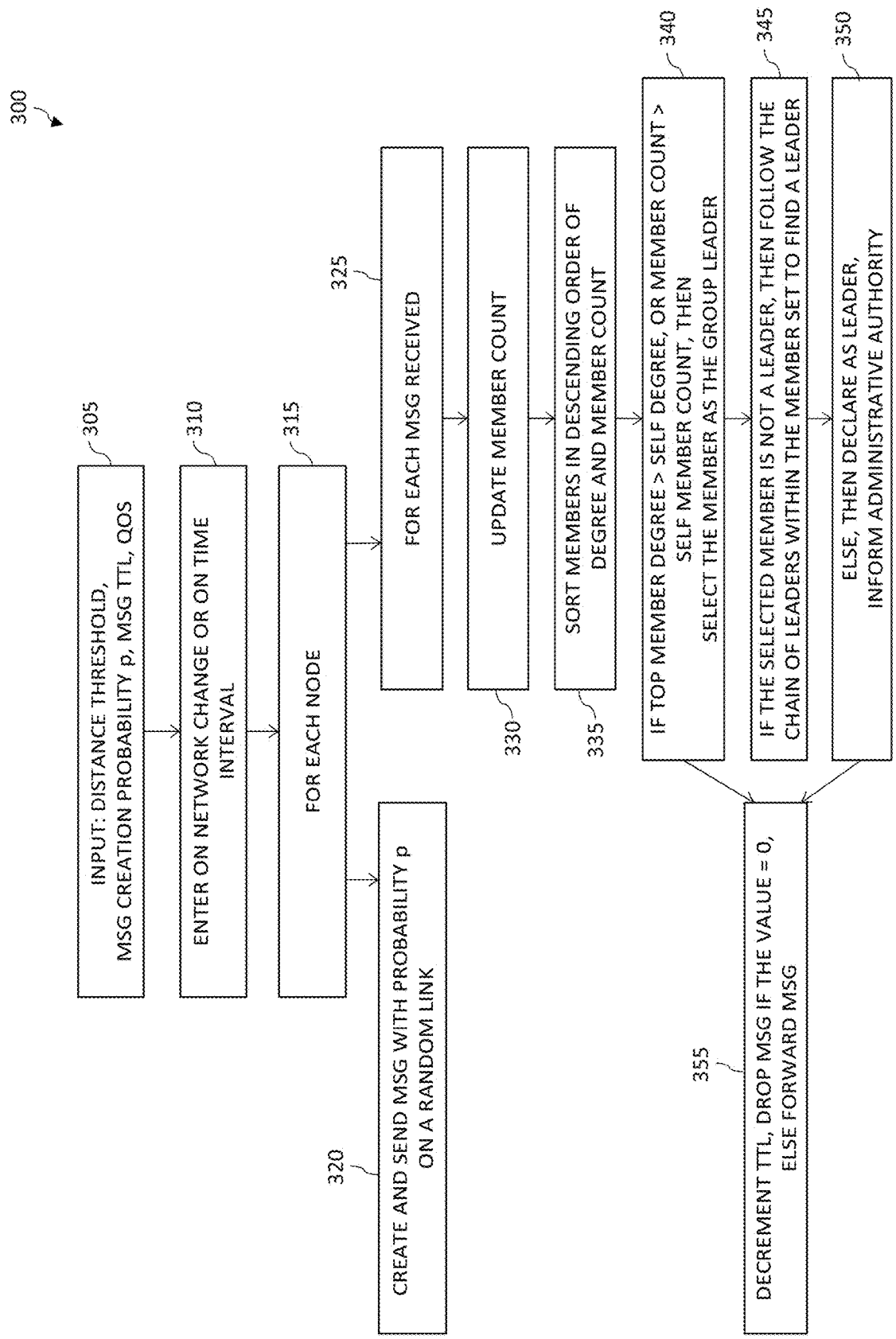
FIG. 3 depicts an example embodiment of a method for performing dynamic node cluster discovery in a network based on a particular set of parameters and metrics.

FIG. 3 depicts an example embodiment of a method for performing dynamic node cluster discovery in a network based on a particular set of parameters and metrics. It will be appreciated that, although primarily presented as being performed serially, at least a portion of the blocks of method 300 may be performed contemporaneously or in a different order than as presented in FIG. 3.

In FIG. 3, at block 305, a set of inputs is obtained. The inputs include the distance threshold for identifying potential cluster members, a message creation probability p for creation of discovery messages in the network, a TTL for discovery messages in the network, and a QoS parameter.

In FIG. 3, block 310 indicates that other blocks of the method 300 are going to be executed on a network change (e.g., where discovery messages are sent in response to a condition, such as the addition of a new node, the failure of an existing node, the detection of a traffic condition, or the like) or on a time interval (e.g., where discovery messages are sent periodically).

In FIG. 3, block 315 indicates that each node is going to perform certain functions within the context of performing dynamic node cluster discovery. These functions result in the creation of discovery messages for circulation within the network and processing of discovery messages received within the network for supporting cluster discovery in the network. From block 315, the method 300 proceeds to block 320 (which is related to discovery node creation) and block 325 (which is related to discovery node processing for cluster formation).

In FIG. 3, at block 320, each of the nodes creates a discovery message with probability p on a random link. As a result, at least some of the nodes of the network will create discovery messages and send them such that the discovery messages begin circulating within the network.

In FIG. 3, block 325 indicates that each node is going to perform certain functions for processing each discovery message received by the node.

In FIG. 3, at block 330, the member count of the node that receives discovery message is updated based on the discovery message. The member count may be updated by evaluating each of the nodes having visited object blocks in the discovery message. The member count may be updated by determining, for each of the nodes having a visited object block in the discovery message, a distance between the node that received the discovery message and the node associated with the visited object block and determining whether that distance is less than the distance threshold. The member count may be set to the number of nodes for which the distance between the node that receives discovery message and the other node satisfies the distance threshold. These members that are identified in the member count also may be considered to be potential cluster leaders In FIG. 3, at block 335, the node sorts the members in descending order of degree and member count to form a ranked list of members.

In FIG. 3, at block 340, if the degree of the top member is greater than the degree of the node or the member count of the top member is greater than the member count of the node, then the node selects that member as the cluster leader. If the degree of the top member is not greater than the degree of the node and the member count of the top member is not greater than the member count of the node, then the node may select the next member in the ranked list of members. The node may successively check the nodes in the ranked list of members for determining whether to select one of the nodes from the ranked list of members as the cluster leader or for selecting itself as the cluster leader. From block 340, the method 300 proceeds to block 345 for evaluating the selected cluster leader or to block 350 if none of the nodes in the ranked list of members is selected as a cluster leader, and the method 300 proceeds to block 355 for controlling further forwarding of the discovery message by the node.

In FIG. 3, at block 345, if the node that is selected from the ranked list of members is not a leader, then the node may follow the chain of leaders in the member set in order to find a cluster leader. If the node identifies a member that satisfied the conditions to be a cluster leader then the node selects that member as the cluster leader, otherwise the node may select itself as the cluster leader.

In FIG. 3, at block 350, if the node is unable to identify a member to be the cluster leader (in blocks 340 and 345), then the node selects itself as the cluster leader. The node, whether the node has selected a node from the rank list of members as the cluster leader or has selected itself as the cluster leader, informs an administrative authority of the selected cluster leader. From block 350, the method 300 proceeds to block 355 for controlling further forwarding of the discovery message by the node.

In FIG. 3, at block 355, which may be reached from block 340 or block 350, the node controls further forwarding of the discovery message from the node. The node will decrement the TTL value in the header of the discovery message. The node will drop the discovery message if the updated TTL value is zero. The node will forward the discovery message if the updated TTL value is greater than zero.

It will be appreciated that the method 300 may continue to operate within the network so that discovery messages are circulated within the network for enabling the nodes to determine cluster leaders, thereby resulting in clustering of the nodes of the network.

It will be appreciated that, although primarily presented with respect to performing dynamic node cluster discovery based on use of specific parameters and metrics in a particular manner, dynamic node cluster discovery may be performed using such parameter and metric in other ways, using various other parameters and/or metrics, or the like, as well as various combinations thereof.

Figure 4:
FIG. 4 depicts an example embodiment of a discovery message format for a discovery message.

FIG. 4 depicts an example embodiment of a discovery message format for a discovery message. The discovery message format 400 is specified using three tables. The first table of the discovery message format 400 indicates that the discovery message has a single header and a variable number of visited object blocks. The second table of the discovery message format 400 indicates that the header is 24 octets with 16 octets being used for the authority identifier field, 4 octets being used for the message identifier field, 2 octets being used for the TTL field, and 2 octets being reserved for future use. The third table of the discovery message format 400 indicates that each visited object block is 44 octets with 16 octets being used for the node identifier field, 2 octets being used for the member count field, 2 octets being used for the degree field, 16 octets being used for the leader node field, and 8 octets being used for the timestamp field. It will be appreciated that, based on the above settings, a 1500 byte IPv6 packet can include approximately 32 visited object blocks in the payload: (1500−24−40)/44 where the 40 bytes that are subtracted include the Ethernet header and the IPv6 protocol header size. It will be appreciated that the discovery message 400 format may assign the 68 octets in other ways, may use fewer or more octets, or the like.

Figure 5A:
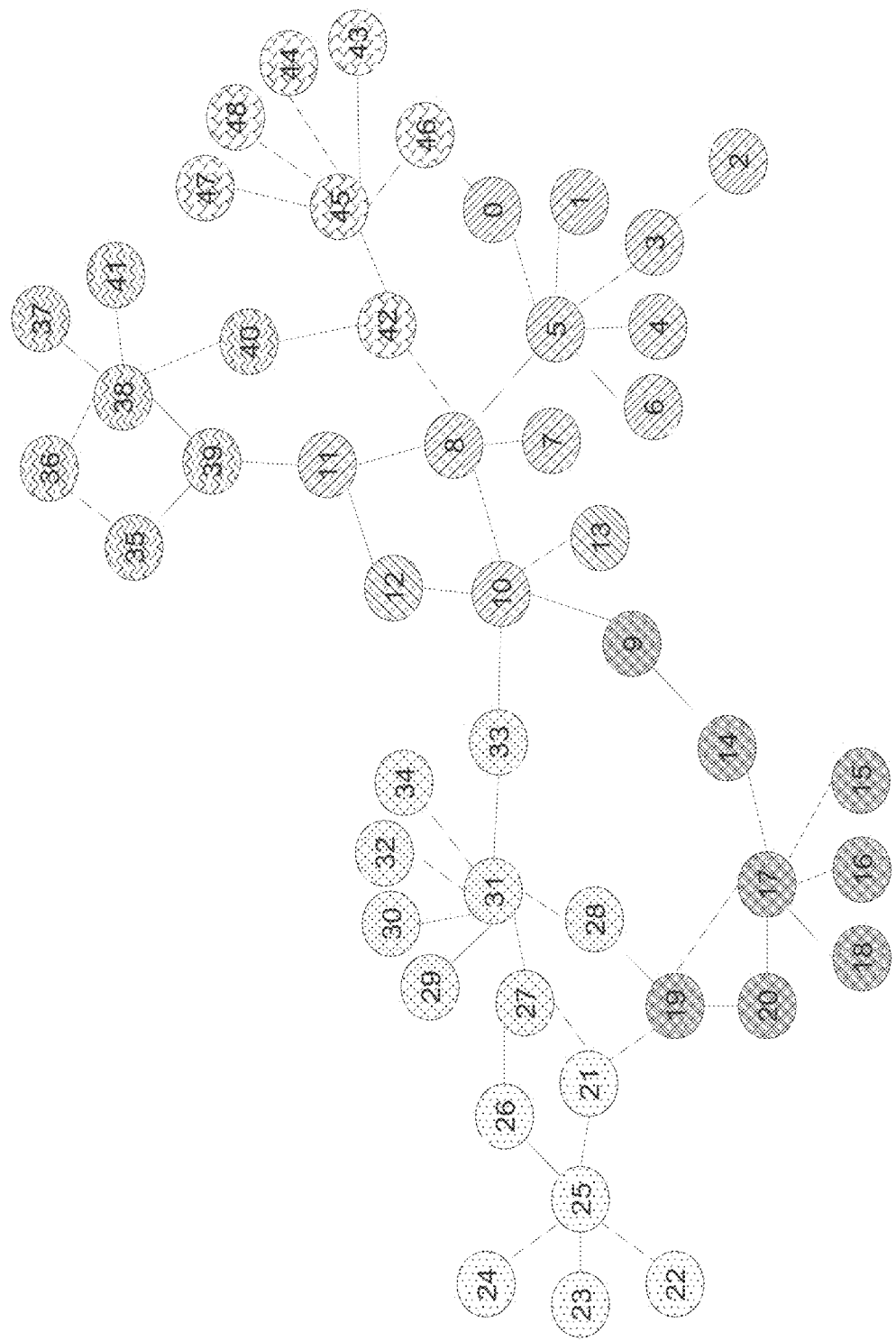
FIGS. 5A and 5B depict examples illustrating node clustering in a network of a simulation environment for two latency zone distances.
Figure 5B:
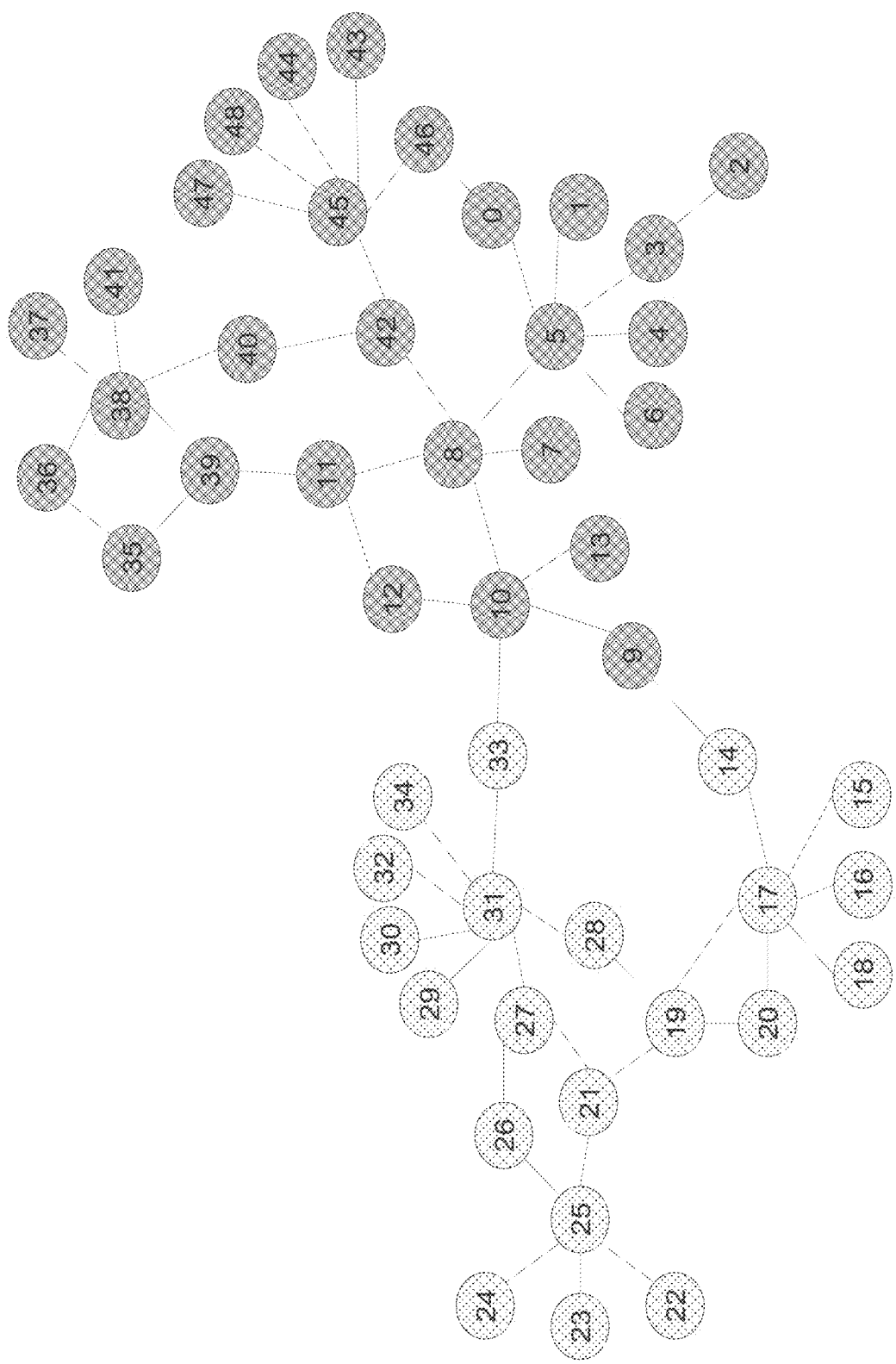

It is noted that, in a first simulation experiment, a simulation was performed for clustering nodes in a network of 49 nodes. Results are depicted in FIG. 5A and FIG. 5B. Namely, FIG. 5A and FIG. 5B depict an example illustrating node clustering in a network of a simulation environment for two latency zone distances. In the examples of FIG. 5A and FIG. 5B, the network includes 49 nodes, the TTL value is set to 50, and the IP packets are limited to a maximum of 50 visited object blocks before being dropped. The node clusters are indicated by patterns within the nodes. FIG. 5A depicts the node clustering that results for a latency zone distance of 2, which has the following node clustering: (1)

a cluster including nodes 0-8 and 10-11, (2) a cluster including nodes 12-13, (3) a cluster including nodes 9 and 14-20, (4) a cluster including nodes 21-26, (5) a cluster including nodes 27-34, (6) a cluster including nodes 35-41, and (7) a cluster including nodes 42-48. FIG. 5B depicts the node clustering that results for a latency zone distance of 6, which has the following node clustering: (1) a cluster including nodes 0-13 and 35-48 and (2) a cluster including nodes 14-34.

It is noted that, in a second simulation experiment, a simulation was done by creating a random tree graph and running algorithms on the tree graph. The tree graph had 250 nodes and 249 links. It is noted that a tree graph was selected so that there are no cycles in the graph as cycles would make it more difficult to estimate the total number of expected messages. The widely deployed OSPF routing algorithm running on this graph would result in approximately 62250 message transmissions to distribute the link state information from each node to all other nodes in the network. In five simulation runs, the AGD algorithm sent an average of 19875 messages, based on use of voting-based cluster leader selection, to do the cluster computation for a latency zone distance of 3 where each link hop is taken as 1 unit (it will be appreciated that this number of messages is expected to be lower in the case where cluster leader selection is based on degree rather than voting). It should be noted that AGD message distribution is only for the given latency zone distance, not the complete network. In the simulation, the cluster computation starts when each node receives and sends at least one message to each neighbor and receives a message from each node within the latency zone diameter. In a field deployment, at any given time, the system would be operating in a continuous steady state, and the nodes would report if their cluster leadership changes.

Figure 6:
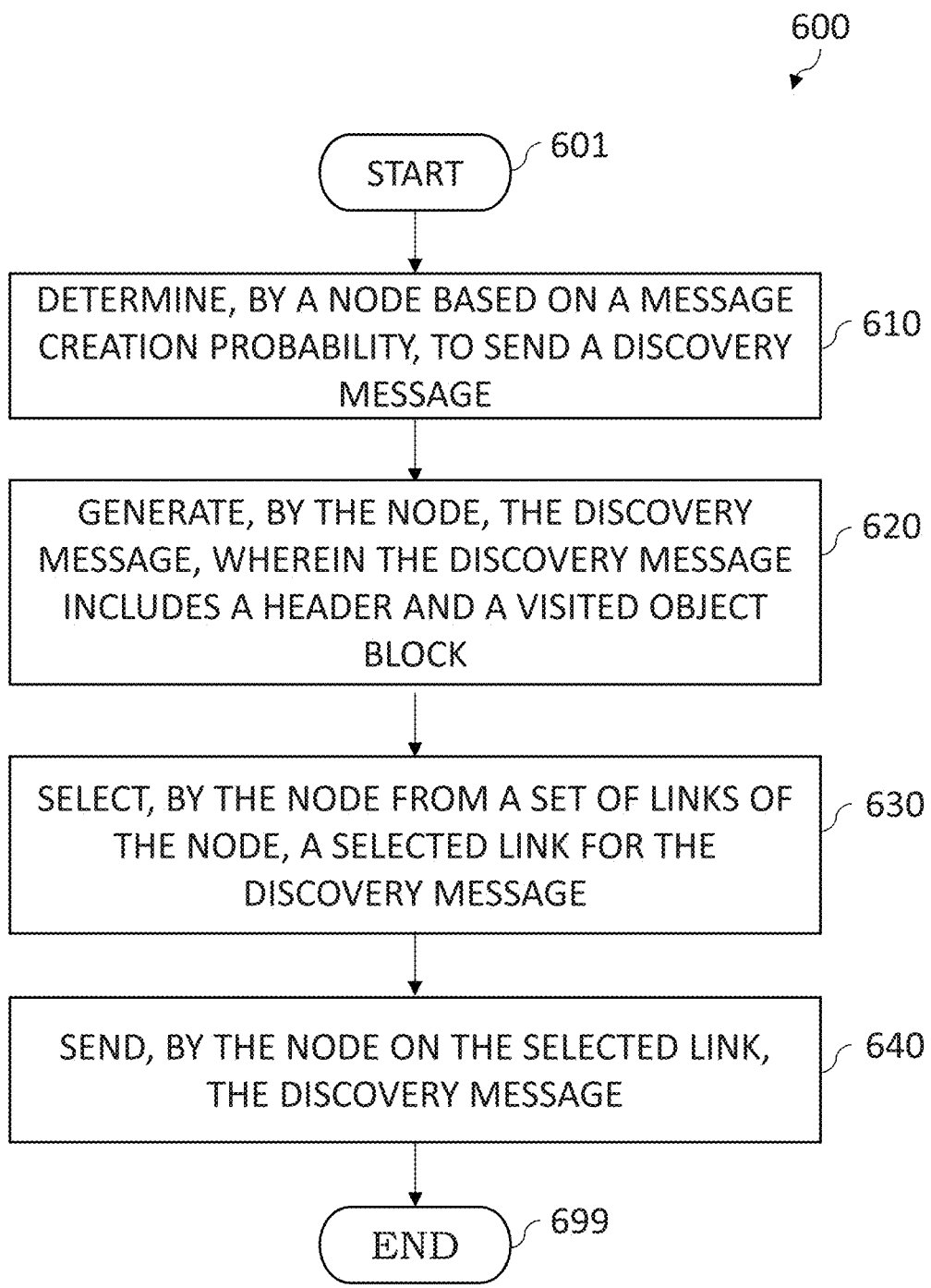
FIG. 6 depicts an example embodiment of a method for use by a node for supporting node cluster discovery.

FIG. 6 depicts an example embodiment of a method for use by a node for supporting node cluster discovery. It will be appreciated that, while primarily presented as being performed serially, at least a portion of the blocks of method 600 may be performed contemporaneously or in a different order than as presented in FIG. 6. At block 601, the method 600 begins. At block 610, determine, by a node based on a message creation probability, to send a discovery message. At block 620, generate, by the node, the discovery message, wherein the discovery message includes a header and a visited object block. At block 630, select, by the node from a set of links of the node, a selected link for the discovery message. At block 640, send, by the node on the selected link, the discovery message. At block 699, the method 600 ends.

Figure 7:
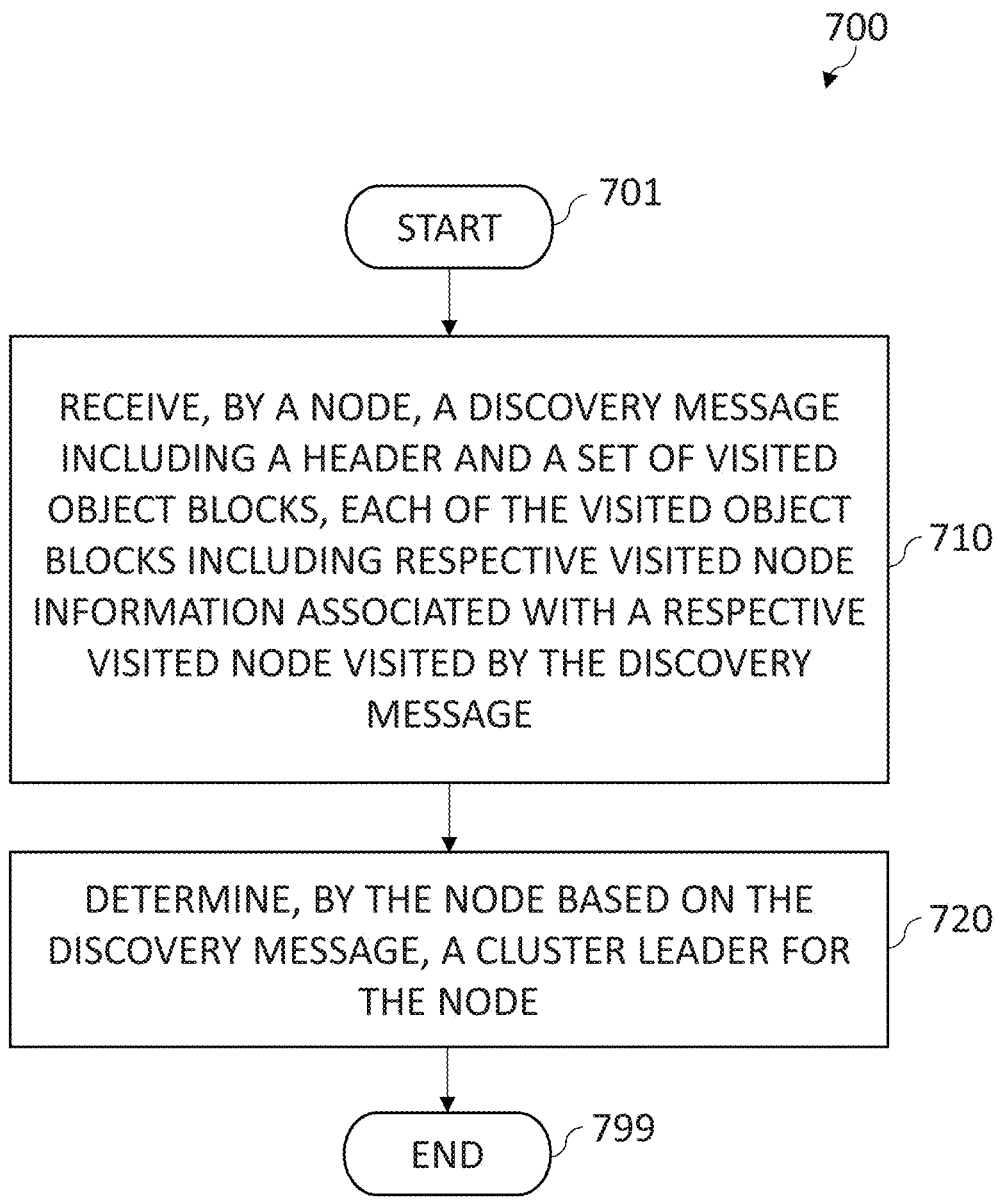
FIG. 7 depicts an example embodiment of a method for use by a node for supporting node cluster discovery.

FIG. 7 depicts an example embodiment of a method for use by a node for supporting node cluster discovery. It will be appreciated that, while primarily presented as being performed serially, at least a portion of the blocks of method 700 may be performed contemporaneously or in a different order than as presented in FIG. 7. At block 701, the method 700 begins. At block 710, receive, by a node, a discovery message including a header and a set of one or more visited object blocks, each of the visited object blocks including respective visited node information associated with a respective visited node visited by the discovery message. At block 720, determine, by the node based on the discovery message, a cluster leader for the node. At block 799, the method 700 ends.

It will be appreciated that, although primarily presented with respect to performing dynamic node cluster discovery using of discovery messages having specific properties (e.g., including specific information, specific arrangements of information, specific generation and forwarding properties such as random probabilistic distribution, and so forth), dynamic node cluster discovery may be performed using discovery messages having various other properties (e.g., including other types of information, other arrangements of information, other generation and forwarding properties, or the like, as well as various combinations thereof) may be used for node clustering management.

It will be appreciated that, although primarily presented with respect to performing dynamic node cluster discovery for particular types of networks (e.g., networks having specific types, numbers, and arrangements of nodes, networks based on specific networking technologies, or the like), dynamic node cluster discovery may be performed in various other types of networks (e.g., networks having other types, numbers, and/or arrangements of nodes, networks based on other types of networking technologies, or the like, as well as various combinations thereof).

Various example embodiments for supporting dynamic node cluster discovery in a communication network may provide various advantages or potential advantages. For example, various example embodiments for supporting dynamic node cluster discovery may be configured to support dynamic discovery of node clusters in a manner configured to support network routing based on various network services which may change dynamically. For example, various example embodiments for supporting dynamic node cluster discovery may be configured to allow discovery of network node clusters with no knowledge of network topology of the network, thereby enabling discovery of network node clusters on networks of any size (including large networks). For example, various example embodiments for supporting dynamic node cluster discovery may be configured to automatically determine the number of clusters without the need for pre-determining the number of clusters as is typically needed for many clustering algorithms. For example, various example embodiments for supporting dynamic node cluster discovery may be configured, when the network clustering criterion is given as packet transmission latency, to combine message passing action with the transfer of distance measure into a single, implicit action such that, when the cluster discovery messages are randomly circulating in a given network, after a statistically determined number of iterations, each node is able to discover which cluster zone to which it belongs. For example, various example embodiments for supporting dynamic node cluster discovery, by setting specific QoS indicated in cluster discovery messages, may be configured to create latency zone clusters that are specific to quality-of-service classes. For example, various example embodiments for supporting dynamic node cluster discovery, since the latency measures in a network generally are not constant but change depending on various factors (e.g., current traffic loads, network failures, or the like), may be configured to continuously and dynamically update network cluster formations as the network (e.g., network utilization) changes. For example, various example embodiments for supporting dynamic node cluster discovery, by supporting automated clustering based on latency, may be configured to support node cluster discovery in networks supporting low latency or ultra-low latency networks services (e.g., industrial automation, autonomous transportation, or the like) by using clustering based on latency zone clusters that may be configured to support bounded packet transmission latency and based on latency zone clusters that are specific to quality-of-service classes. For example, various example embodiments for supporting dynamic node cluster discovery may be configured to support discovery of network clusters in a distributed manner with an unknown network topology, discovery of QoS-specific network clusters, discovery of network clusters without a preset cluster count (i.e., the number of clusters is determined automatically), discovery of network clusters based on random message circulation within the network, discovery of network clusters based on chaining of distance metrics, discovery of multiple concentric network cluster zones with different criteria thresholds with a single round of computation, discovery of multi-level hierarchical network clusters without knowledge of the topology of the network, or the like, as well as various combinations thereof. Various example embodiments for supporting dynamic node cluster discovery may be configured to support node clustering with much lower operational complexity than many clustering algorithms due to the autonomous nature of the node clustering algorithm. Various example embodiments for supporting dynamic node cluster discovery in a communication network may provide various other advantages or potential advantages.

It will be appreciated that, although primarily described with respect to supporting dynamic node cluster discovery in a particular context (namely, for clustering of nodes, such as routers or switches, in a communication network), various example embodiments presented herein may be used or adapted for use for supporting dynamic node cluster discovery in various other contexts in which clustering may be applied (e.g., social network analysis, biotechnology, other contexts or disciplines which may utilized mathematical graph theory, or the like, as well as various combinations thereof).

Figure 8:
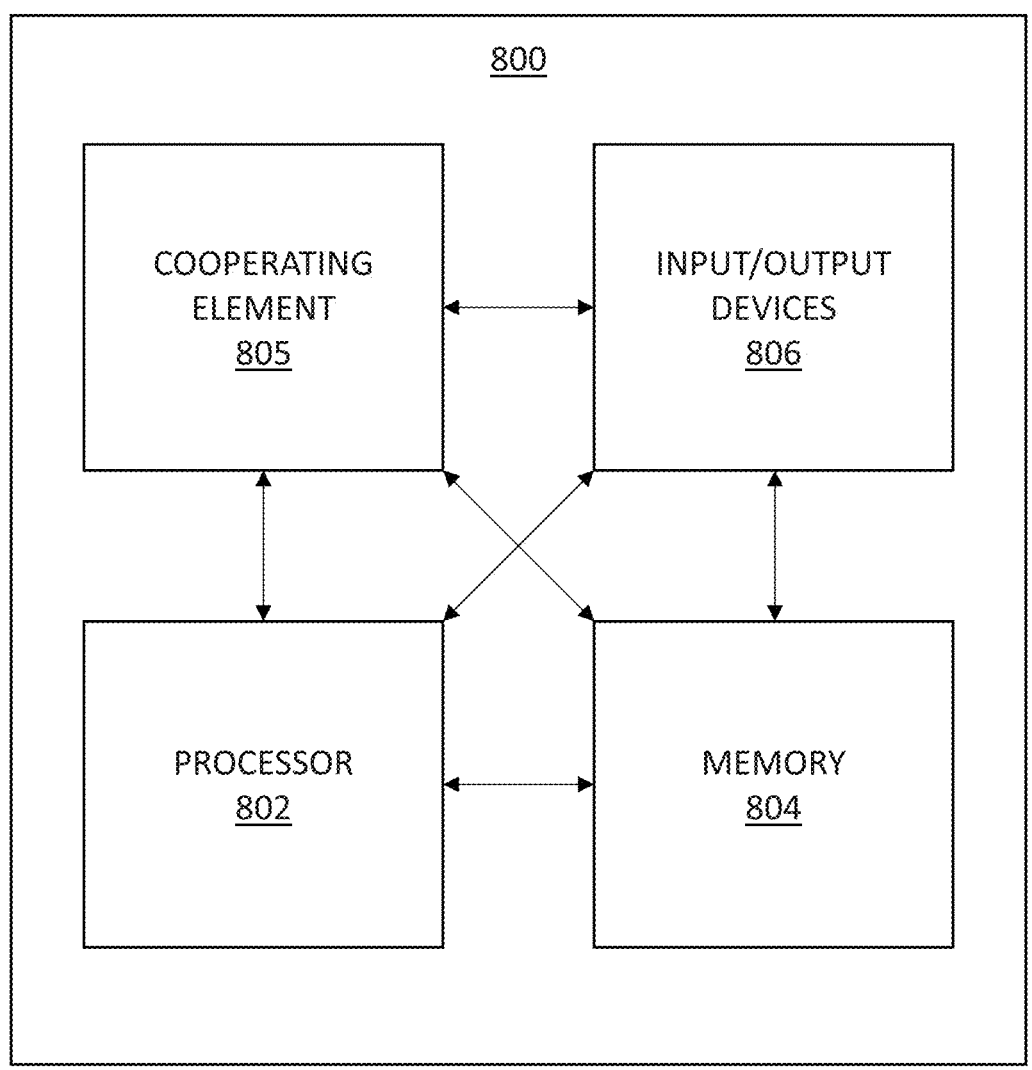
FIG. 8 depicts an example embodiment of a computer suitable for use in performing various functions presented herein.

FIG. 8 depicts an example embodiment of a computer suitable for use in performing various functions presented herein.

The computer 800 includes a processor 802 (e.g., a central processing unit (CPU), a processor, a processor having a set of processor cores, a processor core of a processor, or the like) and a memory 804 (e.g., a random access memory, a read only memory, or the like). The processor 802 and the memory 804 may be communicatively connected. In at least some example embodiments, the computer 800 may include at least one processor and at least one memory including a set of instructions, wherein the set of instructions is configured to, when executed by the at least one processor, cause the computer to perform various functions presented herein.

The computer 800 also may include a cooperating element 805. The cooperating element 805 may be a hardware device. The cooperating element 805 may be a process that can be loaded into the memory 804 and executed by the processor 802 to implement various functions presented herein (in which case, for example, the cooperating element 805 (including associated data structures) can be stored on a non-transitory computer-readable storage medium, such as a storage device or other suitable type of storage element (e.g., a magnetic drive, an optical drive, or the like)).

The computer 800 also may include one or more input/output devices 806. The input/output devices 806 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 800 may represent a general architecture and functionality suitable for implementing functional elements described herein, portions of functional elements described herein, or the like, as well as various combinations thereof. For example, computer 800 may provide a general architecture and functionality that is suitable for implementing one or more elements presented herein, such as a network devices (e.g., routers, switches, or the like), network controllers, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory storing instructions that, when executed by the at least one processor, cause the apparatus to:
   receive, by a node, a discovery message including a header and a set of visited object blocks, each of the visited object blocks including respective visited node information associated with a respective visited node visited by the discovery message, wherein the visited object blocks associated with the respective visited nodes include at least one of respective degrees of the visited nodes or respective member counts of the visited nodes; and
   determine, by the node based on the discovery message, a cluster leader for the node, wherein the cluster leader for the node is determined based on at least one of the respective degrees of the visited nodes or the respective member counts of the visited nodes.

2. The apparatus of claim 1, wherein the header includes an authority identifier of an administrative authority for cluster formation, a message identifier of the discovery message, and a time-to-live value for the discovery message.

3. The apparatus of claim 2, wherein, for at least one of the visited object blocks, the respective visited node information associated with the respective visited node visited by the discovery message includes a node identifier of the visited node, a member count of the visited node, a degree of the visited node, a cluster leader selected by the visited node, and a timestamp.

4. The apparatus of claim 3, wherein, to determine the cluster leader for the node, the instructions, when executed by the at least one processor, cause the apparatus to:
determine, by the node, whether to select one of the visited nodes associated with one of the visited object blocks in the discovery message as the cluster leader or whether to select itself as the cluster leader.

5. The apparatus of claim 1, wherein, to determine the cluster leader for the node, the instructions, when executed by the at least one processor, cause the apparatus to:
determine, by the node based on the discovery message, a set of potential cluster leaders; and
determine, by the node based on the set of potential cluster leaders, the cluster leader for the node.

6. The apparatus of claim 5, wherein one of:
the set of potential cluster leaders includes each of the visited nodes visited by the discovery message; or
the set of potential cluster leaders is determined based on at least one of a degree parameter or a member count parameter.

7. The apparatus of claim 1, wherein the instructions, when executed by the at least one processor, cause the apparatus to:
generate, by the node based on the discovery message, a local visited object block for the node;
insert, by the node, the local visited object block into the set of visited object blocks of the discovery message to form an updated discovery message; and
send, by the node, the updated discovery message.

8. The apparatus of claim 1, wherein the instructions, when executed by the at least one processor, cause the apparatus to:
determine, by the node based on a time-to-live value in the header of the discovery message, to drop the discovery message without further forwarding the discovery message.

9. An apparatus, comprising:
at least one processor; and
at least one memory storing instructions that, when executed by the at least one processor, cause the apparatus to:
receive, by a node, a discovery message including a header and a set of visited object blocks, each of the visited object blocks including respective visited node information associated with a respective visited node visited by the discovery message;
determine, by the node based on the discovery message, a set of potential cluster leaders for the node, wherein the set of potential cluster leaders is determined based on at least one of a degree parameter or a member count parameter; and
determine, by the node based on the set of potential cluster leaders, the cluster leader for the node.

10. The apparatus of claim 5, wherein the set of potential cluster leaders is determined based on a normalized parameter determined based on normalization of a parameter based on a distance metric.

11. The apparatus of claim 10, wherein the distance metric is a latency metric measured from the node.

12. The apparatus of claim 5, wherein, to determine the cluster leader for the node based on the set of potential cluster leaders, the instructions, when executed by the at least one processor, cause the apparatus to:
rank, by the node, the potential cluster leaders to form a ranked list of the potential cluster leaders; and
determine, by the node based on the ranked list of the potential cluster leaders, the cluster leader for the node.

13. The apparatus of claim 12, wherein the potential cluster leaders are ranked, to form the ranked list of potential cluster leaders, based on at least one of a parameter or a metric.

14. The apparatus of claim 12, wherein the potential cluster leaders are determined based on a normalized parameter determined based on normalization of a parameter based on a metric, wherein the potential cluster leaders are ranked, to form the ranked list of potential cluster leaders, based on the parameter.

15. The apparatus of claim 14, wherein the parameter is a degree parameter or a member count parameter, wherein the metric is a distance metric.

16. The apparatus of claim 7, wherein the updated discovery message is sent toward a link selected uniformly at random from a set of links of the node.

17. The apparatus of claim 7, wherein the node is associated with an administrative domain, wherein the updated discovery message is sent toward a second node in the administrative domain.

18. The apparatus of claim 7, wherein the node is associated with a first administrative domain, wherein the updated discovery message is sent toward a second node in a second administrative domain based on a determination that the node is selected as the cluster leader for the node.

19. An apparatus, comprising:
at least one processor; and
at least one memory including is configured to, instructions that, when executed by the at least one processor, cause the apparatus to:
determine, by a node based on a message creation probability, to send a discovery message;
generate, by the node, the discovery message, wherein the discovery message includes a header and a visited object block;
select, by the node from a set of links of the node, a selected link for the discovery message; and
send, by the node on the selected link, the discovery message.

* * * * *